United States Patent
Seok

(10) Patent No.: US 9,775,174 B2
(45) Date of Patent: Sep. 26, 2017

(54) METHOD AND DEVICE FOR TRANSMITTING/RECEIVING FRAME IN ACCORDANCE WITH BANDWIDTH THEREOF IN WLAN SYSTEM

(71) Applicant: LG ELECTRONICS INC., Seoul (KR)

(72) Inventor: Yongho Seok, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 27 days.

(21) Appl. No.: 14/763,490

(22) PCT Filed: Oct. 30, 2013

(86) PCT No.: PCT/KR2013/009727
§ 371 (c)(1),
(2) Date: Jul. 24, 2015

(87) PCT Pub. No.: WO2014/126323
PCT Pub. Date: Aug. 21, 2014

(65) Prior Publication Data
US 2016/0014813 A1    Jan. 14, 2016

Related U.S. Application Data

(60) Provisional application No. 61/765,060, filed on Feb. 15, 2013, provisional application No. 61/766,114, (Continued)

(51) Int. Cl.
*H04W 74/08* (2009.01)
*H04L 27/00* (2006.01)
(Continued)

(52) U.S. Cl.
CPC ....... *H04W 74/0808* (2013.01); *H04L 1/1671* (2013.01); *H04L 27/0006* (2013.01);
(Continued)

(58) Field of Classification Search
CPC .. H04W 74/0816; H04W 80/02; H04W 84/12
See application file for complete search history.

(56) References Cited

U.S. PATENT DOCUMENTS

| 7,177,661 B2 | 2/2007 | Shpak |
| 7,924,801 B2 | 4/2011 | Kang et al. |
| (Continued) | | |

FOREIGN PATENT DOCUMENTS

| EP | 1681807 | 7/2006 |
| EP | 2106166 | 9/2009 |
| (Continued) | | |

OTHER PUBLICATIONS

IEEE Standards Association, Part 11: Wireless LAN Medium Access Control (MAC) and Physical Layer (PHY) Specifications, IEEE STD 802.11, Mar. 29, 2012, 2,793 pages.

(Continued)

*Primary Examiner* — Raj Jain
(74) *Attorney, Agent, or Firm* — Lee Hong Degerman Kang Waimey

(57) ABSTRACT

The present invention relates to a wireless communication system and, more specifically, provides a method and device for transmitting/receiving a frame in accordance with the bandwidth thereof in a WLAN system. The method whereby a station (STA) performs virtual carrier sensing (VCS) in a WLAN system according to one embodiment of the present invention may comprise the steps of: receiving a frame by the STA; determining by the STA, a VCS time length value on the basis of the response indication parameter and/or channel bandwidth type of the frame; and deferring channel access by the STA for the VCS time length value.

16 Claims, 15 Drawing Sheets

Related U.S. Application Data filed on Feb. 18, 2013, provisional application No. 61/803,073, filed on Mar. 18, 2013, provisional application No. 61/842,959, filed on Jul. 3, 2013.

(51) Int. Cl.

| | | |
|---|---|---|
| *H04L 1/16* | (2006.01) | |
| *H04W 72/04* | (2009.01) | |
| *H04W 80/02* | (2009.01) | |
| *H04L 5/00* | (2006.01) | |
| *H04W 84/12* | (2009.01) | |

(52) U.S. Cl.
CPC ..... *H04W 72/044* (2013.01); *H04W 72/0406* (2013.01); *H04W 72/0446* (2013.01); *H04W 74/0816* (2013.01); *H04L 5/0053* (2013.01); *H04W 80/02* (2013.01); *H04W 84/12* (2013.01)

(56) References Cited

U.S. PATENT DOCUMENTS

| | | | | |
|---|---|---|---|---|
| 8,060,796 | B2 | 11/2011 | Wang et al. | |
| 2002/0071448 | A1* | 6/2002 | Cervello | H04W 74/0816 |
| | | | | 370/445 |
| 2009/0010199 | A1* | 1/2009 | Adachi | H04W 40/02 |
| | | | | 370/315 |
| 2009/0303888 | A1 | 12/2009 | Ariyur et al. | |
| 2012/0147804 | A1 | 6/2012 | Hedayat et al. | |
| 2012/0327870 | A1 | 12/2012 | Grandhi et al. | |
| 2013/0083762 | A1* | 4/2013 | Adachi | H04W 48/18 |
| | | | | 370/329 |
| 2013/0155976 | A1 | 6/2013 | Chen et al. | |
| 2013/0223427 | A1* | 8/2013 | Sohn | H04W 74/06 |
| | | | | 370/338 |
| 2013/0235860 | A1 | 9/2013 | Vermani et al. | |
| 2013/0272198 | A1 | 10/2013 | Azizi et al. | |
| 2014/0233478 | A1 | 8/2014 | Wentink et al. | |
| 2015/0009978 | A1* | 1/2015 | Choi | H04L 25/03866 |
| | | | | 370/338 |

FOREIGN PATENT DOCUMENTS

| | | |
|---|---|---|
| JP | 2016-513415 | 5/2006 |
| JP | 2016-513415 | 5/2016 |
| KR | 10-2004-0100331 | 12/2004 |
| KR | 10-2005-0040454 | 5/2005 |
| KR | 10-2005-0100951 | 10/2005 |
| KR | 10-2006-0078209 | 7/2006 |
| KR | 10-0684167 | 2/2007 |
| KR | 10-0703686 | 4/2007 |
| KR | 1020070057622 | 6/2007 |
| KR | 10-0849623 | 7/2008 |
| KR | 10-2012-0079741 | 7/2012 |
| RU | 2350026 | 3/2009 |
| RU | 2463736 | 10/2012 |
| WO | 2010/085069 | 7/2010 |
| WO | 2012/027614 | 3/2012 |
| WO | 2012/064502 | 5/2012 |
| WO | 2013/022254 | 2/2013 |

OTHER PUBLICATIONS

PCT International Application No. PCT/KR2013/009727, Written Opinion of the International Searching Authority dated Feb. 12, 2014, 15 pages.
PCT International Application No. PCT/KR2013/009730, Written Opinion of the International Searching Authority dated Jan. 29, 2014, 19 pages.
Eldad, Perahia, "TGn LB97 Submission for PHY Time and miscellaneous CIDs," Intel Corporation, IEEE 802.11-07/2033r00, Jun. 25, 2007, 5 pages.
Tomoko Adachi, "TGn LB97 Submission for Category "backoff" in MAC ad-hoc," Toshiba Corporation, IEEE 802.11-07/0636r10, Apr. 17, 2007, 6 pages.
PCT International Application No. PCT/KR2013/009727, Written Opinion of the International Searching Authority dated Feb. 12, 2014, 12 pages.
Tomoko Adachi, "TGn LB97 Submission for Category "backoff" in MAC ad-hoc," Toshiba Corporation, IEEE 802.11-07/0636r12, Apr. 17, 2007, 6 pages.
Russian Federation Federal Service for Intellectual Property, Patents and Trademarks Application Serial No. 2015139153/08(060040), Notice of Allowance dated Nov. 23, 2016, 10 pages.
Choi, et al., "Definitions of ACK and CTS Timeout", doc.: IEEE 802.11-02/313r0, May 2002, 8 pages.
Lv Kaiying, et al., "MAC Header Design for Small Data Packet for 802.11ah", doc.: IEEE 802.11-12/0094r2, Jan. 2012, 12 pages.
Cariou et al., "Short ACK", doc.: IEEE 802.11-12/0109r0, Jan. 2012, 14 pages.
Wong, et al., "Speed Frame Exchange", doc.: IEEE 802.11-12/0834r0, Jul. 2012, 18 pages.
Park, "Proposed Specification Framework for TGah D10.x", doc.: IEEE 802.11-12/1158r0, XP68039910, Sep. 2012, 36 pages.
European Patent Office Application Serial No. 13874908.0, Search Report dated Sep. 7, 2016, 8 pages.
European Patent Office Application Serial No. 13875029.4, Search Report dated Sep. 7, 2016, 9 pages.
U.S. Appl. No. 14/768,024, Office Action dated Feb. 28, 2017, 11 pages.

* cited by examiner

ACKTimeout = SIFS + Slot Time + PHY - RX - START -Delay (a)  (b)

METHOD AND DEVICE FOR TRANSMITTING/RECEIVING FRAME IN ACCORDANCE WITH BANDWIDTH THEREOF IN WLAN SYSTEM

CROSS-REFERENCE TO RELATED APPLICATIONS

This application is the National Stage filing under 35 U.S.C. 371 of International Application No. PCT/KR2013/009727, filed on Oct. 30, 2013, which claims the benefit of U.S. Provisional Application No. 61/765,060, filed on Feb. 15, 2013, 61/766,114, filed on Feb. 18, 2013, 61/803,073, filed on Mar. 18, 2013 and 61/842,959, filed on Jul. 3, 2013, the contents of which are all hereby incorporated by reference herein in their entirety.

TECHNICAL FIELD

The present invention relates to a wireless communication system and more particularly, to a method and apparatus for transmitting and receiving a frame according to a bandwidth in a Wireless Local Area Network (WLAN) system.

BACKGROUND ART

Along with the recent development of information and communication technology, a variety of wireless communication techniques have been developed. Among them, the WLAN enables a user to wirelessly access the Internet based on radio frequency technology in a home, an office, or a specific service area using a portable terminal such as a Personal Digital Assistant (PDA), a laptop computer, a Portable Multimedia Player (PMP), etc.

To overcome limitations in communication speed that the WLAN faces, the recent technical standards have introduced a system that increases the speed, reliability, and coverage of a wireless network. For example, the Institute of Electrical and Electronics Engineers (IEEE) 802.11n standard has introduced Multiple Input Multiple Output (MIMO) that is implemented using multiple antennas at both a transmitter and a receiver in order to support High Throughput (HT) at a data processing rate of up to 540 Mbps, minimize transmission errors, and optimize data rates.

DISCLOSURE

Technical Problem

Machine-to-Machine (M2M) communication is under discussion as a future-generation communication technology. In the IEEE 802.11 WLAN system, a technical standard for supporting M2M communication is being developed as IEEE 802.11ah. For M2M communication, a scenario in which a small amount of data is transmitted at a low rate from time to time in an environment with a very large number of devices may be considered.

An object of the present invention is to provide a method for preventing resource waste and enabling reliable frame exchange by holding a response frame or deferring channel access in consideration of a response frame type and/or a bandwidth.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

In an aspect of the present invention, a method for performing Virtual Carrier Sensing (VCS) in a Wireless Local Area Network (WLAN) system, performed by a STAtion (STA) includes receiving a frame by the STA, determining a VCS time length based on at least one of a response indication parameter and a channel bandwidth type of the frame by the STA, and deferring channel access during the VCS time length by the STA.

In another aspect of the present invention, an STA for performing VCS in a WLAN system includes a transceiver and a processor. The processor is configured to receive a frame using the transceiver, to determine a VCS time length based on at least one of a response indication parameter and a channel bandwidth type of the frame, and to defer channel access during the VCS time length.

The followings are applicable commonly to the embodiments of the present invention.

The channel bandwidth type may indicate a channel bandwidth type of a response frame transmitted in response to the frame.

The channel bandwidth type may be one of a 1-MHz preamble channel bandwidth type and a 2-MHz or above preamble channel bandwidth type.

If the response indication parameter indicates a normal response frame, the VCS time length may be determined based on the sum of a transmission time of the normal response frame and a Short Inter-Frame Space (SIFS).

The transmission time of the normal response frame may be determined according to the channel bandwidth type.

The transmission time of the normal response frame may be determined separately for a 1-MHz preamble channel bandwidth type and a 2-MHz or above preamble channel bandwidth type.

If the response indication parameter indicates a Null Data Packet (NDP) response frame, the VCS time length may be determined based on a transmission time of the NDP response frame and an SIFS.

The transmission time of the NDP response frame may be determined according to the channel bandwidth type.

The transmission time of the NDP response frame may be determined separately for a 1-MHz preamble channel bandwidth type and a 2-MHz or above preamble channel bandwidth type.

If the response indication parameter indicates a long response frame, the VCS time length may be determined based on the sum of a maximum Physical Layer Convergence Protocol (PLCP) Protocol Data Unit (PPDU) transmission time and an SIFS.

If the response indication parameter indicates no response, the VCS time length may be set to 0.

An Address 1 field indicating a Receiver Address (RA) of the received frame may include an Association Identifier (AID) value, and an Address2 field indicating a Transmitter Address (TA) of the received frame may include a Medium Access Control (MAC) address value. If the AID value of the Address 1 field is identical to an AID value of the STA and the MAC address value of the Address2 field is identical to a MAC address value of an Access Point (AP) with which the STA is associated, a response frame may be generated for the received frame.

If an Address 1 field indicating an RA of the received frame includes a MAC address value, and the MAC address value of the Address1 field is identical to a MAC address value of the STA, a response frame may be generated for the received frame.

The STA may be an STA operating in a Sub 1 GHz (S1G) frequency band.

The foregoing description of the present invention and the following detailed description of the present invention are given for illustrative purposes to provide an additional description of the appended claims.

Advantageous Effects

According to the present invention, a method for preventing resource waste and enabling reliable frame exchange can be provided by providing a method and apparatus for holding a response frame or deferring channel access in consideration of a response frame type and/or a bandwidth.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention and are incorporated in and constitute a part of this application, illustrate embodiments of the invention and together with the description serve to explain the principle of the invention. In the drawings.

BEST MODE FOR CARRYING OUT THE INVENTION

Figure 1:
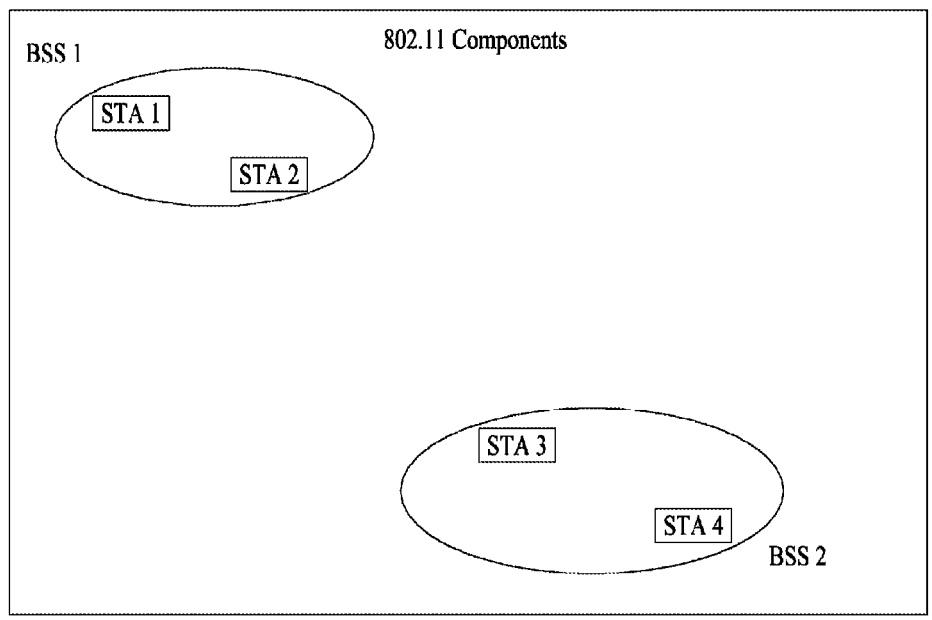
FIG. 1 illustrates an exemplary configuration of an Institute of Electrical and Electronics Engineers (IEEE) 802.11 system to which the present invention is applicable.

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention. The following detailed description includes specific details in order to provide a thorough understanding of the present invention. However, it will be apparent to those skilled in the art that the present invention may be practiced without such specific details.

The following embodiments are proposed by combining constituent components and characteristics of the present invention according to a predetermined format. The individual constituent components or characteristics should be considered optional factors on the condition that there is no additional remark. If required, the individual constituent components or characteristics may not be combined with other components or characteristics. In addition, some constituent components and/or characteristics may be combined to implement the embodiments of the present invention. The order of operations to be disclosed in the embodiments of the present invention may be changed. Some components or characteristics of any embodiment may also be included in other embodiments, or may be replaced with those of the other embodiments as necessary.

It should be noted that specific terms disclosed in the present invention are proposed for convenience of description and better understanding of the present invention, and the use of these specific terms may be changed to other formats within the technical scope or spirit of the present invention.

In some instances, well-known structures and devices are omitted in order to avoid obscuring the concepts of the present invention and important functions of the structures and devices are shown in block diagram form. The same reference numbers will be used throughout the drawings to refer to the same or like parts.

Exemplary embodiments of the present invention are supported by standard documents disclosed for at least one of wireless access systems including an Institute of Electrical and Electronics Engineers (IEEE) 802 system, a $3^{rd}$ Generation Partnership Project (3GPP) system, a 3GPP Long Term Evolution (LTE) system, an LTE-Advanced (LTE-A) system, and a 3GPP2 system. In particular, steps or parts, which are not described to clearly reveal the technical idea of the present invention, in the embodiments of the present invention may be supported by the above documents. All terminology used herein may be supported by at least one of the above-mentioned documents.

The following embodiments of the present invention can be applied to a variety of wireless access technologies, for example, CDMA (Code Division Multiple Access), FDMA (Frequency Division Multiple Access), TDMA (Time Division Multiple Access), OFDMA (Orthogonal Frequency Division Multiple Access), SC-FDMA (Single Carrier Frequency Division Multiple Access), and the like. CDMA may be embodied through wireless (or radio) technology such as UTRA (Universal Terrestrial Radio Access) or CDMA2000. TDMA may be embodied through wireless (or radio) technology such as GSM (Global System for Mobile communication)/GPRS (General Packet Radio Service)/EDGE (Enhanced Data Rates for GSM Evolution). OFDMA may be embodied through wireless (or radio) technology such as Institute of Electrical and Electronics Engineers (IEEE) 802.11 (Wi-Fi), IEEE 802.16 (WiMAX), IEEE 802-20, and E-UTRA (Evolved UTRA). For clarity, the following description focuses on IEEE 802.11 systems. However, technical features of the present invention are not limited thereto.

WLAN System Structure

FIG. 1 exemplarily shows an IEEE 802.11 system according to one embodiment of the present invention.

The structure of the IEEE 802.11 system may include a plurality of components. A WLAN which supports transparent STA mobility for a higher layer may be provided by mutual operations of the components. A Basic Service Set (BSS) may correspond to a basic constituent block in an IEEE 802.11 LAN. In FIG. 1, two BSSs (BSS1 and BSS2) are shown and two STAs are included in each of the BSSs (i.e. STA1 and STA2 are included in BSS1 and STA3 and STA4 are included in BSS2). An ellipse indicating the BSS in FIG. 1 may be understood as a coverage area in which STAs included in the corresponding BSS maintain communication. This area may be referred to as a Basic Service Area (BSA). If an STA moves out of the BSA, the STA cannot directly communicate with the other STAs in the corresponding BSA.

In the IEEE 802.11 LAN, the most basic type of BSS is an Independent BSS (IBSS). For example, the IBSS may have a minimum form consisting of only two STAs. The BSS (BSS1 or BSS2) of FIG. 1, which is the simplest form and in which other components are omitted, may correspond to a typical example of the IBSS. Such configuration is possible when STAs can directly communicate with each other. Such a type of LAN is not prescheduled and may be configured when the LAN is necessary. This may be referred to as an ad-hoc network.

Memberships of an STA in the BSS may be dynamically changed when the STA is switched on or off or the STA enters or leaves the BSS region. The STA may use a synchronization process to join the BSS. To access all services of a BSS infrastructure, the STA should be associated with the BSS. Such association may be dynamically configured and may include use of a Distribution System Service (DSS).

Figure 2:
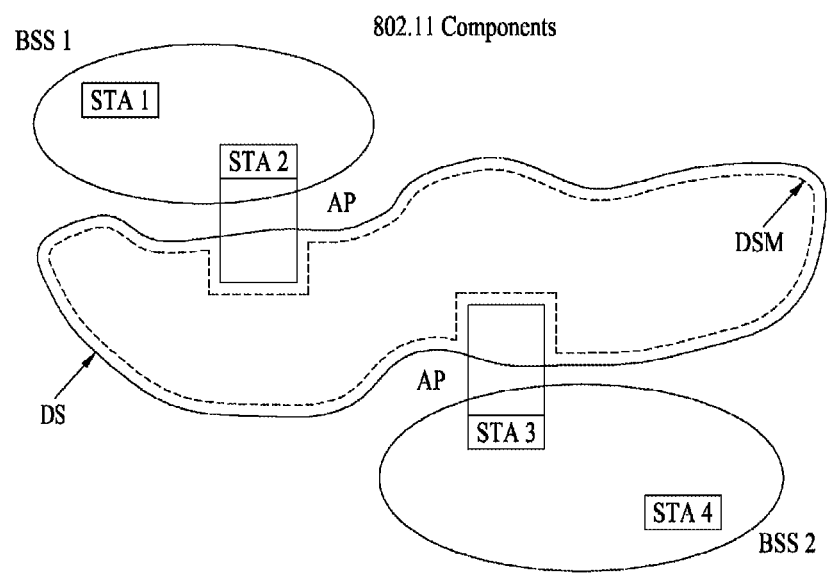
FIG. 2 illustrates another configuration of an IEEE 802.11 system to which the present invention is applicable.

FIG. 2 is a diagram showing another exemplary structure of an IEEE 802.11 system to which the present invention is applicable. In FIG. 2, components such as a Distribution System (DS), a Distribution System Medium (DSM), and an Access Point (AP) are added to the structure of FIG. 1.

A direct STA-to-STA distance in a LAN may be restricted by Physical layer (PHY) performance. In some cases, such restriction of the distance may be sufficient for communication. However, in other cases, communication between STAs over a long distance may be necessary. The DS may be configured to support extended coverage.

The DS refers to a structure in which BSSs are connected to each other. Specifically, a BSS may be configured as a component of an extended form of a network consisting of a plurality of BSSs, instead of independent configuration as shown in FIG. 1.

The DS is a logical concept and may be specified by the characteristic of the DSM. In relation to this, a Wireless Medium (WM) and the DSM are logically distinguished in IEEE 802.11. Respective logical media are used for different purposes and are used by different components. In definition of IEEE 802.11, such media are not restricted to the same or different media. The flexibility of the IEEE 802.11 LAN architecture (DS architecture or other network architectures) can be explained in that a plurality of media is logically different. That is, the IEEE 802.11 LAN architecture can be variously implemented and may be independently specified by a physical characteristic of each implementation.

The DS may support mobile devices by providing seamless integration of multiple BSSs and providing logical services necessary for handling an address to a destination.

The AP refers to an entity that enables associated STAs to access the DS through a WM and that has STA functionality. Data may move between the BSS and the DS through the AP. For example, STA2 and STA3 shown in FIG. 2 have STA functionality and provide a function of causing associated STAs (STA1 and STA4) to access the DS. Moreover, since all APs correspond basically to STAs, all APs are addressable entities. An address used by an AP for communication on the WM need not always be identical to an address used by the AP for communication on the DSM.

Data transmitted from one of STAs associated with the AP to an STA address of the AP may always be received by an uncontrolled port and may be processed by an IEEE 802.1X port access entity. If the controlled port is authenticated, transmission data (or frame) may be transmitted to the DS.

Figure 3:
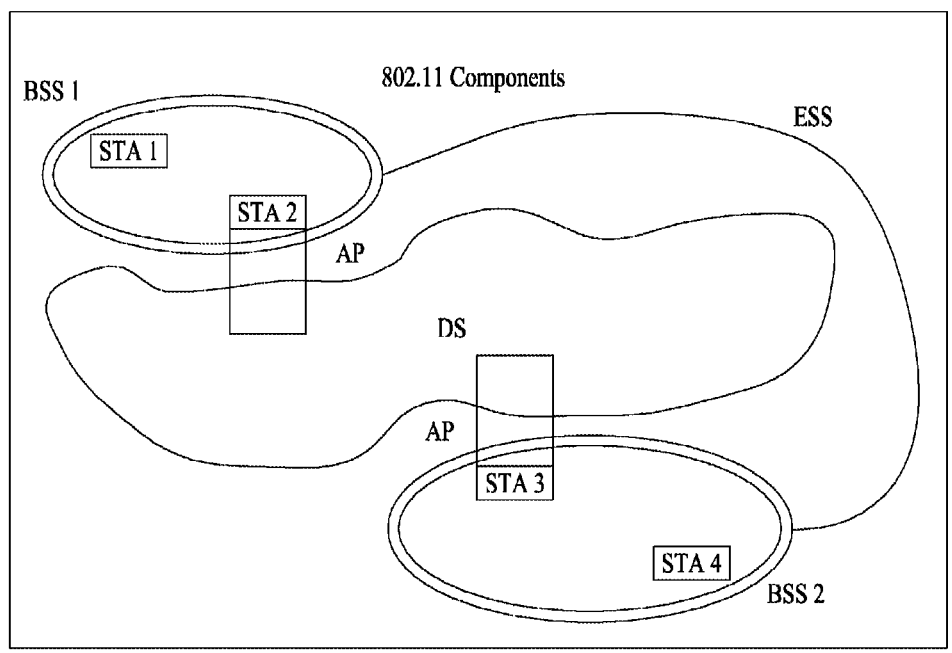
FIG. 3 illustrates a further configuration of an IEEE 802.11 system to which the present invention is applicable.

FIG. 3 is a diagram showing still another exemplary structure of an IEEE 802.11 system to which the present invention is applicable. In addition to the structure of FIG. 2, FIG. 3 conceptually shows an Extended Service Set (ESS) for providing wide coverage.

A wireless network having arbitrary size and complexity may be comprised of a DS and BSSs. In the IEEE 802.11 system, such a type of network is referred to an ESS network. The ESS may correspond to a set of BSSs connected to one DS. However, the ESS does not include the DS. The ESS network is characterized in that the ESS network appears as an IBSS network in a Logical Link Control (LLC) layer. STAs included in the ESS may communicate with each other and mobile STAs are movable transparently in LLC from one BSS to another BSS (within the same ESS).

In IEEE 802.11, relative physical locations of the BSSs in FIG. 3 are not assumed and the following forms are all possible. BSSs may partially overlap and this form is generally used to provide continuous coverage. BSSs may not be physically connected and the logical distances between BSSs have no limit. BSSs may be located at the same physical position and this form may be used to provide redundancy. One or more IBSSs or ESS networks may be physically located in the same space as one or more ESS networks. This may correspond to an ESS network form in the case in which an ad-hoc network operates in a location in which an ESS network is present, the case in which IEEE 802.11 networks of different organizations physically overlap, or the case in which two or more different access and security policies are necessary in the same location.

Figure 4:
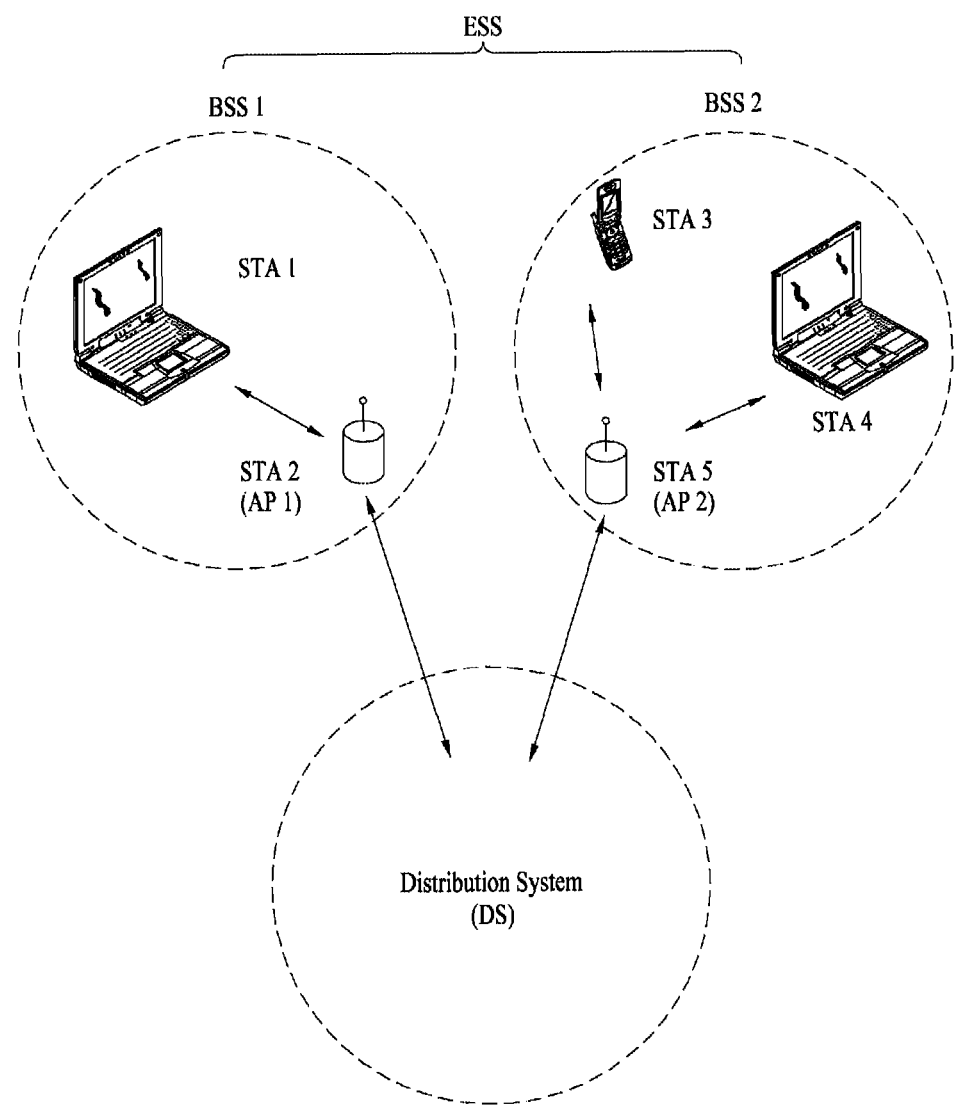
FIG. 4 illustrates an exemplary configuration of a Wireless Local Area Network (WLAN) system.

FIG. 4 is a diagram showing an exemplary structure of a WLAN system. In FIG. 4, an example of an infrastructure BSS including a DS is shown.

In the example of FIG. 4, BSS1 and BSS2 constitute an ESS. In the WLAN system, an STA is a device operating according to MAC/PHY regulation of IEEE 802.11. STAs include AP STAs and non-AP STAs. The non-AP STAs correspond to devices, such as laptop computers or mobile phones, handled directly by users. In FIG. 4, STA1, STA3, and STA4 correspond to the non-AP STAs and STA2 and STA5 correspond to AP STAs.

In the following description, the non-AP STA may be referred to as a terminal, a Wireless Transmit/Receive Unit (WTRU), a User Equipment (UE), a Mobile Station (MS), a mobile terminal, or a Mobile Subscriber Station (MSS). The AP is a concept corresponding to a Base Station (BS), a Node-B, an evolved Node-B (e-NB), a Base Transceiver System (BTS), or a femto BS in other wireless communication fields.

Layer Architecture

In the WLAN system, an operation of an AP and/or an STA may be described from the perspective of layer architecture. Layer architecture in terms of device configuration may be implemented by a processor. The AP or the STA may have a plurality of layer structures. For example, the 802.11 standard specifications mainly deal with the Medium Access Control (MAC) sublayer of the Data Link Layer (DLL) and the PHY layer. The PHY layer may include a Physical Layer Convergence Protocol (PLCP) entity and a Physical Medium Dependent (PMD) entity. Both the MAC sublayer and the PHY layer conceptually include management entities, called MAC Sublayer Management Entity (MLME) and PHY Layer Management Entity (PLME). These entities provide layer management service interfaces through which layer management functions may be invoked.

In order to provide a correct MAC operation, a Station Management Entity (SME) is present within each AP/STA. The SME is a layer-independent entity that may be viewed as residing in a separate management plane or as residing off to the side. The exact functions of the SME are not specified herein, but in general this entity may be viewed as being responsible for such functions as gathering of information about layer-dependent statuses from various Layer Management Entities (LMEs) and similarly setting of the values of layer-specific parameters. The SME may typically perform such functions on behalf of general system management entities and may implement standard management protocols.

The foregoing entities interact in various ways. For example, the entities may interact with each other by exchanging GET/SET primitives. An XX-GET.request primitive is used to request the value of a given MIB attribute (management information-based attribute information). An XX-GET.confirm primitive returns an appropriate MIB attribute value if Status is set to "success" and otherwise, returns an error indication in a Status field. An XX-SET.request primitive is used to request that an indicated MIB attribute be set to a given value. If this MIB attribute implies a specific action, then this requests that the action be performed. An XX-SET.confirm primitive confirms that an indicated MIB attribute was set to a requested value, if Status is set to "success," and otherwise, it returns an error condition in the Status field. If this MIB attribute implies a specific action, then this confirms that the action was performed.

The MLME and the SME may exchange various MLME_GET/SET primitives via an MLME SAP (Service Access Point). Also, various PLMEM GET/SET primitives may be exchanged between the PLME and the SME via a PLME SAP and between the MLME and the PLME via an MLME-PLME SAP.

Link Setup Process

Figure 5:
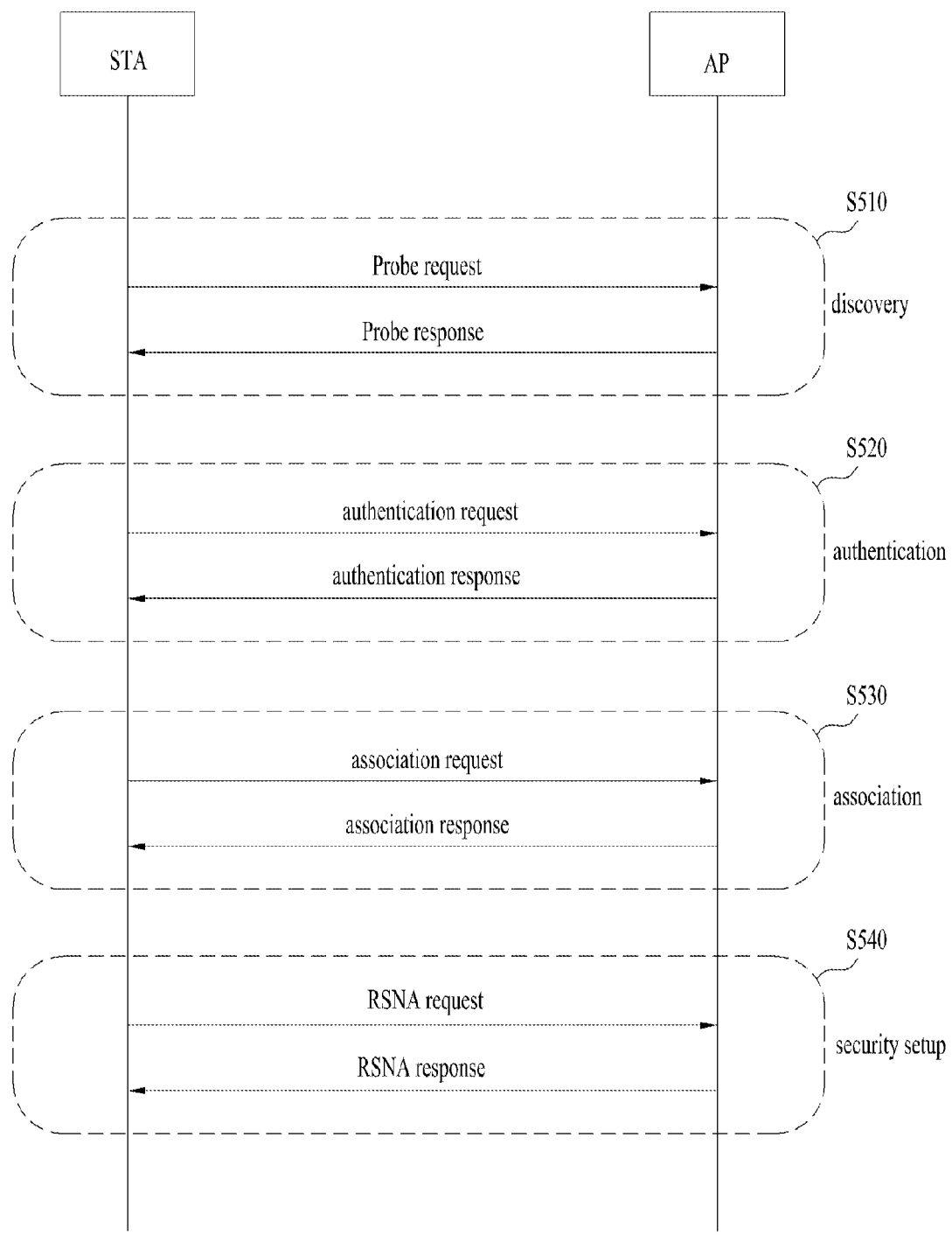
FIG. 5 is a flowchart illustrating a link setup process for use in the WLAN system.

FIG. 5 is a flowchart illustrating a general link setup process.

In order to allow an STA to set up a link with a network and transmit/receive data to/from the network, the STA should perform network discovery, authentication, association, and authentication for security. The link setup process may also be referred to as a session initiation process or a session setup process. In addition, discovery, authentication, association, and security setup steps of the link setup process may be generically referred to as an association process.

An exemplary link setup process will be described with reference to FIG. 5.

In step S510, the STA may perform network discovery. The network discovery may include scanning of the STA. That is, the STA should search for an available network so as to access the network. The STA should identify a compatible network before joining in a wireless network. The process for identifying a network in a specific region is referred to as scanning.

Scanning is classified into active scanning and passive scanning.

FIG. 5 illustrates a network discovery operation including active scanning. In the case of active scanning, the STA transmits a probe request frame and waits for a response to the probe request frame, while changing channels in order to determine an AP present around the STA. A responder transmits a probe response frame as a response to the probe request frame to the STA that has transmitted the probe request frame. The responder may be an STA that has finally transmitted a beacon frame in a BSS of the scanned channel. In a BSS, since an AP transmits a beacon frame, the AP is a responder. In a BSS, since STAs of the IBSS sequentially transmit beacon frames, the responder is not constant. For example, the STA, which has transmitted a probe request frame on Channel #1 and has received a probe response frame on Channel #1, may store BSS-related information included in the received probe response frame, move to the next channel (for example, Channel #2), and perform scanning on the next channel in the same manner (i.e., probe request/response transmission/reception on Channel #2).

Although not illustrated in FIG. 5, the scanning operation may also be carried out by passive scanning. An STA that performs passive scanning waits for a beacon frame, while moving from one channel to another channel. The beacon frame is one of management frames in IEEE 802.11, indicates the presence of a wireless network, enables the STA performing scanning to search for the wireless network, and is periodically transmitted in such a manner that the STA may join in the wireless network. In a BSS, an AP periodically transmits a beacon frame. In an IBSS, STAs of the IBSS sequentially transmit beacon frames. Upon receipt of a beacon frame during scanning, an STA stores BSS information included in the beacon frame, moves to another channel, and records beacon frame information for each channel. Upon receipt of a beacon frame, an STA stores BSS-related information included in the received beacon frame, moves to the next channel, and performs scanning on the next channel in the same manner.

In comparison between active scanning and passive scanning, active scanning advantageously has a shorter delay and less power consumption than passive scanning.

After the STA discovers the network, the STA may perform an authentication process in step S520. The authentication process may be referred to as a first authentication process to clearly distinguish the authentication process from a security setup process of step S540.

The authentication process may include transmission of an authentication request frame to an AP by the STA, and transmission of an authentication response frame to the STA by the AP in response to the authentication request frame. The authentication frame used for an authentication request/response may be a management frame.

An authentication frame may include an authentication algorithm number, an authentication transaction sequence number, a status code, challenge text, a Robust Security Network (RSN), a Finite Cyclic Group (FCG), etc. The above-mentioned information included in the authentication request/response frame may be an example of part of information that may be included in the authentication request/response frame, may be replaced with other information, or may include additional information.

The STA may transmit the authentication request frame to the AP. The AP may determine whether to authenticate the STA based on information included in the received authentication request frame. The AP may provide the result of the authentication process to the STA in the authentication response frame.

After the STA is successfully authenticated, the association process may be carried out in step S530. The association process may involve transmitting an association request frame to the AP by the STA, and transmitting an association response frame to the STA by the AP in response to the association request frame.

For example, the association request frame may include information related to various capabilities, a beacon listen interval, a Service Set Identifier (SSID), supported rates, supported channels, an RSN, a mobility domain, supported operating classes, a Traffic Indication Map (TIM) broadcast request, interworking service capability, etc.

For example, the association response frame may include information related to various capabilities, a status code, an Association ID (AID), supported rates, an Enhanced Distributed Channel Access (EDCA) parameter set, a Received Channel Power Indicator (RCPI), a Received Signal to Noise Indicator (RSNI), a mobility domain, a timeout interval (association comeback time), an overlapping BSS scan parameter, a TIM broadcast response, a Quality of Service (QoS) map, etc.

The above-mentioned information may be an example of part of information that may be included in the association request/response frame, may be replaced with other information, or may include additional information.

After the STA is successfully associated with the network, a security setup process may be carried out in step S540. The security setup process of step S540 may be referred to as an authentication process based on a Robust Security Network Association (RSNA) request/response. The authentication process of step S520 may be referred to as the first authentication process, and the security setup process of step S540 may also be simply referred to as an authentication process.

For example, the security setup process of step S540 may include a private key setup process through 4-way handshaking based on an (Extensible Authentication Protocol over LAN (EAPOL) frame. In addition, the security setup process may also be carried out in a security scheme that has not been defined in the IEEE 802.11 standards.

WLAN Evolution

In order to overcome limitations in WLAN communication speed, IEEE 802.11n has recently been established as a technology standard. IEEE 802.11n aims to increase network speed and reliability and extend the coverage of the wireless network. More specifically, IEEE 802.11n supports a High Throughput (HT) of up to 540 Mbps and is based on Multiple Input Multiple Output (MIMO) using multiple antennas at both a transmitter and a receiver in order to minimize transmission errors and optimize data rates.

With the widespread use of WLAN technology and diversification of WLAN applications, there is a need to develop a new WLAN system capable of supporting a higher throughput than a data processing speed supported by IEEE 802.11n. A next-generation WLAN system supporting Very High Throughput (VHT) is the next version (i.e., IEEE 802.11ac) of the IEEE 802.11n WLAN system, and is one of IEEE 802.11 WLAN systems recently proposed to support a data process speed of 1 Gbps or more at a MAC Service Access Point (SAP).

In order to efficiently utilize a radio channel, the next-generation WLAN system supports Multi-User Multiple Input Multiple Output (MU-MIMO) transmission in which a plurality of STAs may simultaneously access a channel. In MU-MIMO transmission, the AP may simultaneously transmit a packet to at least one MIMO-paired STA.

In addition, supporting of WLAN system operations in whitespace is under discussion. For example, the introduction of the WLAN system in whitespace (TV WS) such as a frequency band (for example, ranging from 54 MHz to 698 MHz) because that becomes idle due to the transition from analog TV to digital TV has been discussed as the IEEE 802.11af standard. However, this is purely exemplary and the whitespace may be a licensed band that a licensed user may primarily use. The licensed user may be a user who has authority to use the licensed band, and may also be referred to as a licensed device, a primary user, an incumbent user, or the like.

For example, an AP and/or STA operating in the WhiteSpace (WS) should provide a function for protecting the licensed user. For example, if the licensed user such as a microphone has already used a specific WS channel that is a frequency band regulated to have a specific bandwidth in the WS band, the AP and/or STA may not use the frequency band corresponding to the WS channel so as to protect the licensed user. In addition, the AP and/or STA should discontinue using the frequency band, if the licensed user uses a frequency band used for transmission and/or reception of a current frame.

Therefore, the AP and/or STA should determine whether a specific frequency band of the WS band is available. In other words, the AP and/or STA should determine the presence or absence of a licensed user in the frequency band. Determination as to the presence or absence of the licensed user in a specific frequency band is referred to as spectrum sensing. An energy detection scheme, a signature detection scheme, and the like are used as the spectrum sensing mechanism. If the strength of a received signal is equal to or larger than a predetermined vale, the AP and/or STA may determine that the frequency band is being used by a licensed user. If a DTV preamble is detected, the AP and/or STA may determine that the frequency band is being used by a licensed user.

Machine to Machine (M2M) communication is under discussion as a next-generation communication technology. A technical standard for supporting M2M communication has been developed as IEEE 802.11ah in the IEEE 802.11 WLAN system. M2M communication refers to a communication scheme involving one or more machines, or is also be referred to as Machine Type Communication (MTC) or Device to Device (D2D) communication. A machine refers to an entity that does not require direct handling and intervention of a user. For example, not only a meter or automatic vending machine equipped with an RF module, but also a User Equipment (UE) such as a smartphone capable of performing communication by automatically accessing the network without user intervention/handling may be an example of such machines. M2M communication may include D2D communication and communication between a device and an application server, etc. As exemplary communication between a device and an application server, communication between a vending machine and an application server, communication between a Point of Sale (POS) device and an application server, and communication between an electric meter, a gas meter or a water meter and an application server. M2M-based communication applications may include security, transportation, healthcare, etc. Considering the above-mentioned application examples, M2M communication should be able to support intermittent transmission/reception of a small amount of data at low speed under an environment including a large number of devices.

Specifically, M2M communication should be able to support a large number of STAs. Although the current WLAN system is based on the assumption that one AP is associated with up to 2007 STAs, various methods for supporting association of many more STAs (e.g., about 6000 STAs) with one AP have recently been discussed for M2M communication. In addition, it is expected that many applications supporting/requesting a low transmission rate are present in M2M communication. In order to smoothly support this, an STA may recognize the presence or absence of data to be transmitted to the STA based on a Traffic Indication Map (TIM) element in the WLAN system, and various methods for reducing the bitmap size of the TIM have recently been discussed. In addition, it is expected that there will exists traffic data having a very long transmission/reception interval in M2M communication. For example, a very small amount of data such as the amount of used electricity/gas/water needs to be transmitted at long intervals (for example, every month). Therefore, although the number of STAs associated with one AP increases in the WLAN system, many developers and companies are conducting intensive research into an WLAN system which can efficiently support the case in which there are a very small number of STAs, each of which has a data frame to be received from the AP during one beacon period.

As described above, the WLAN technology has been rapidly evolving, and not only the above-mentioned exemplary technologies but also other technologies such as a direct link setup, improvement of media streaming throughput, support of high-speed and/or large-scale initial session setup, and support of an extended bandwidth and operation frequency, are under development.

Medium Access Mechanism

In the IEEE 802.11 WLAN system, a basic MAC access mechanism is Carrier Sense Multiple Access with Collision Avoidance (CSMA/CA). The CSMA/CA mechanism is referred to as a Distributed Coordination Function (DCF) of IEEE 802.11 MAC, and basically includes a "Listen Before Talk" access mechanism. According to the above-mentioned access mechanism, an AP and/or an STA may perform Clear Channel Assessment (CCA) for sensing an RF channel or medium during a predetermined time interval (for example, DCF Inter-Frame Space (DIFS)), prior to data transmission. If it is determined that the medium is in an idle state, the AP and/or the STA starts frame transmission through the medium. On the other hand, if the AP and/or the STA senses the medium as occupied, the AP and/or the STA does not start its own transmission, sets a delay time (for example, a random backoff period) for medium access, and attempts to start frame transmission after waiting for the delay time. It is expected that multiple STAs will attempt to start frame transmission after waiting for different times by applying random backoff periods, thereby minimize collision.

In addition, the IEEE 802.11 MAC protocol provides a Hybrid Coordination Function (HCF). The HCF is based on a DCF and a Point Coordination Function (PCF). The PCF refers to a polling-based synchronous access scheme in which periodic polling is executed in such a manner that all receiving APs and/or STAs may receive data frames. In addition, the HCF includes Enhanced Distributed Channel Access (EDCA) and HCF Controlled Channel Access (HCCA). In EDCA, access is performed based on contention to provide a data frame to a plurality of users by a provider, whereas in HCCA, a contention-free-based channel access scheme based on a polling mechanism is used. In addition, the HCF includes a medium access mechanism for improving Quality of Service (QoS) of WLAN, and may transmit QoS data during both a Contention Period (CP) and a Contention Free Period (CFP).

Figure 6:
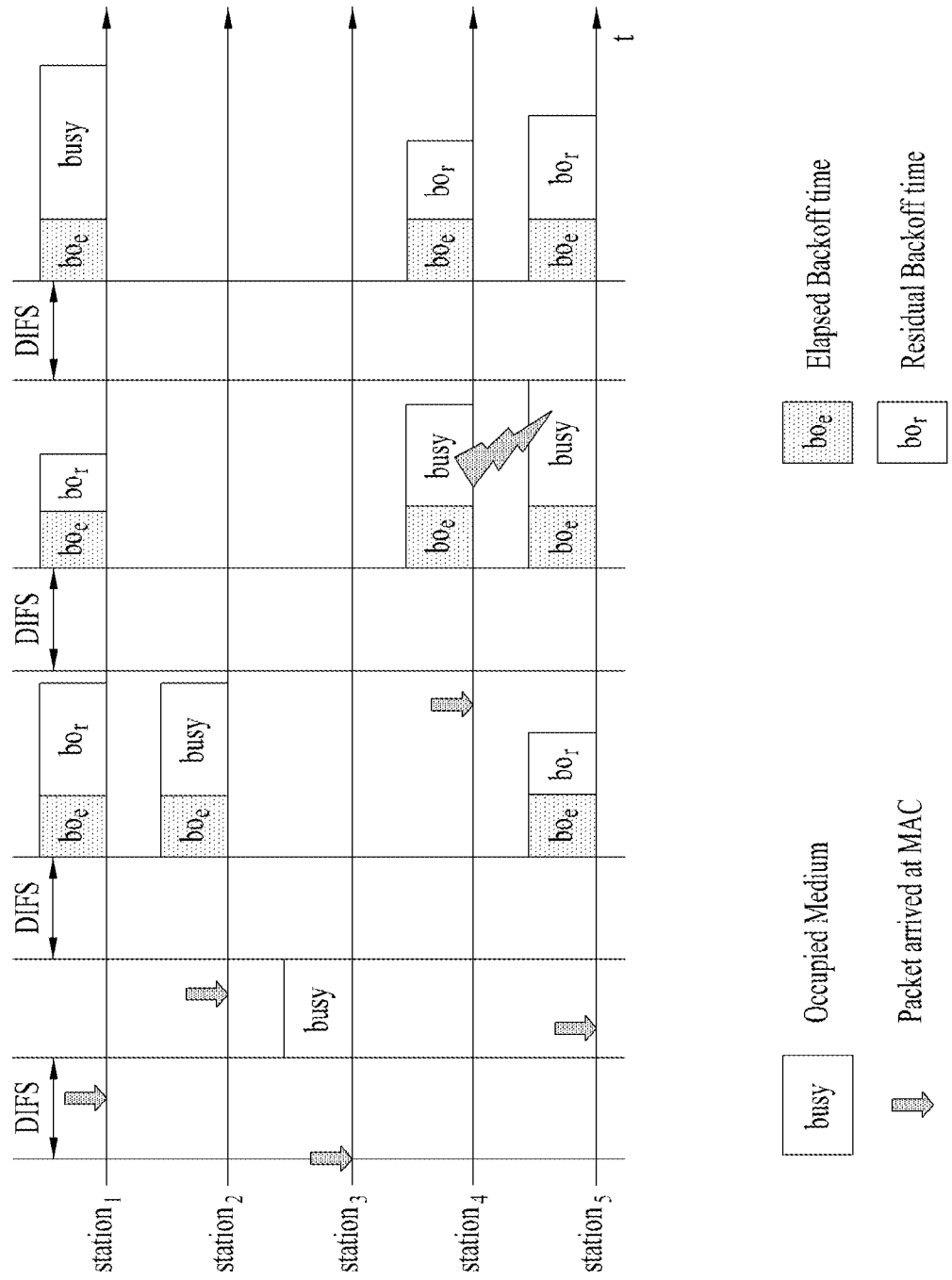
FIG. 6 is a view referred for describing a backoff process.

FIG. 6 is a view referred to describing a backoff process.

An operations based on a random backoff period will be described with reference to FIG. 6. If an occupied or busy medium gets idle, a plurality of STAs may attempt to transmit data (or frames). As a method for minimizing collision, each STA may select a random backoff count, wait for a slot time corresponding to the selected backoff count, and then attempt to start data transmission. The random backoff count is a pseudo-random integer, and may be set to one of 0 to CW values. In this case, CW refers to a Contention Window parameter value. Although an initial value of the CW parameter is denoted by CWmin, the initial value may be doubled in case of a transmission failure (for example, in the case in which an ACK is not received for the transmission frame). If the CW parameter value reaches CWmax, data transmission may be attempted, maintaining CWmax until data transmission is successful. If the data transmission is successful, the CW parameter value is reset to CWmin. Preferably, CW, CWmin, and CWmax are set to $2^n-1$ (where n=0, 1, 2, ... ).

Once the random backoff process starts, the STA continuously monitors the medium while counting down the backoff slot according to the determined backoff count value. If the medium is monitored as occupied, the STA discontinues the count-down and waits for a predetermined time. If the medium gets idle, the STA resumes the count-down of the remaining slot time.

In the example of FIG. 6, if a packet to be transmitted to the MAC of STA3 arrives at STA3, STA3 may determine that the medium is idle during a DIFS and immediately transmit a frame. In the meantime, the other STAs monitor the medium as busy and wait for a predetermined time. During the predetermined time, transmission data may be generated in each of STA1, STA2, and STA5. If the medium is monitored as idle, each STA may wait for a DIFS and then count down backoff slots according to a random backoff count value selected by the STA. In the example of FIG. 6, STA2 selects the lowest backoff count value and STA1 selects the highest backoff count value. That is, at the moment when STA2 finishes backoff counting and starts frame transmission, the residual backoff time of STA5 is shorter than the residual backoff time of STA1. Each of STA1 and STA5 temporarily stops countdown while STA2 occupies the medium, and waits for a predetermined time. If STA2 finishes occupying the medium and the medium re-enters the idle state, each of STA1 and STA5 waits for a predetermined time DIFS, and restarts backoff counting. That is, after the remaining backoff slots as long as the residual backoff time are counted down, frame transmission may be started. Since the residual backoff time of STA5 is shorter than that of STA1, STA5 starts frame transmission. Meanwhile, transmission data may be generated in STA4 while STA2 occupies the medium. In this case, if the medium is in the idle state, STA4 waits for a DIFS, performs countdown according to a random backoff count value selected by STA4, and then starts frame transmission. FIG. 6 exemplarily illustrates the case in which the residual backoff time of STA5 coincides with the random backoff count value of STA4. In this case, an unexpected collision may occur between STA4 and STA5. If the collision occurs between STA4 and STA5, each of STA4 and STA5 does not receive an ACK, resulting in failure of data transmission. In this case, each of STA4 and STA5 may double the CW value, select a random backoff count value, and then perform countdown. Meanwhile, STA1 waits for a predetermined time due to transmission of STA4 and STA5 while the medium is in the occupied state. In this case, if the medium is in the idle state, STA1 waits for the DIFS, and then starts frame transmission after lapse of the residual backoff time.

Sensing Operation of STA

As described above, the CSMA/CA mechanism includes not only a physical carrier sensing mechanism in which an AP and/or an STA directly senses the medium, but also a virtual carrier sensing mechanism. The virtual carrier sensing mechanism is used to solve some problems such as a hidden node problem encountered with the medium access. For the virtual carrier sensing, the MAC of the WLAN system may use a Network Allocation Vector (NAV). The NAV indicates a remaining time until the medium is available, indicated to other APs and/or STAs by the AP and/or STA, each of which currently uses the medium or has authority to use the medium. Accordingly, the NAV value corresponds to a reserved time in which the medium will be used by the AP and/or STA configured to transmit the corresponding frame. An STA having received the NAV value defers medium access during the corresponding reserved time. For example, the NAV may be set according to the value of a 'duration' field of the MAC header of the frame.

A robust collision detect mechanism has been introduced to reduce the probability of collision. The robust collision detect mechanism will be described with reference to FIGS. 7 and 8. Although an actual carrier sensing range is different from a transmission range, it is assumed that the actual carrier sensing range is identical to the transmission range for convenience of description.

Figure 7:
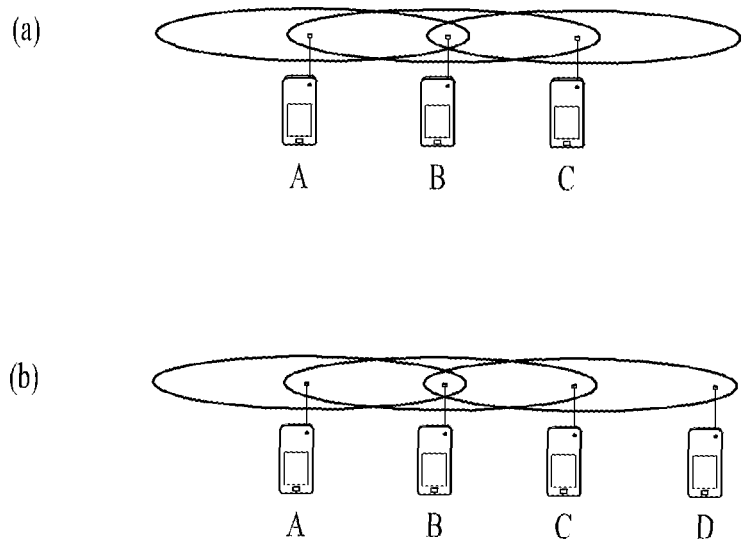
FIG. 7 is a view referred for describing a hidden node and an exposed node.

FIG. 7 is a view referred to for describing a hidden node and an exposed node.

FIG. 7(a) illustrates an exemplary hidden node. In FIG. 7(a), STA A communicates with STA B, and STA C has information to be transmitted. In FIG. 7(a), although STA A is transmitting data to STA B, STA C may determine that a medium is idle when performing carrier sensing before transmitting data to STA B. This is because transmission (i.e., medium occupation) of STA A may not be sensed at the location of STA C. In this case, since STA B simultaneously receives information from STA A and STA C, collision occurs. Here, STA A may be considered as a hidden node to STA C.

FIG. 7(b) illustrates an exemplary exposed node. In FIG. 7(b), while STA B transmits data to STA A, STA C has information to be transmitted to STA D. If STA C performs carrier sensing, it determines that the medium is occupied due to transmission of STA B. Therefore, although STA C has information to be transmitted to STA D, STA C senses the medium as occupied and thus should wait until the medium is idle. However, since STA A is actually located out of the transmission range of STA C, transmission from STA C may not collide with transmission from STA B from the viewpoint of STA A. Thus, STA C unnecessarily waits until STA B stops transmission. Here, STA C may be an exposed node to STA B.

Figure 8:
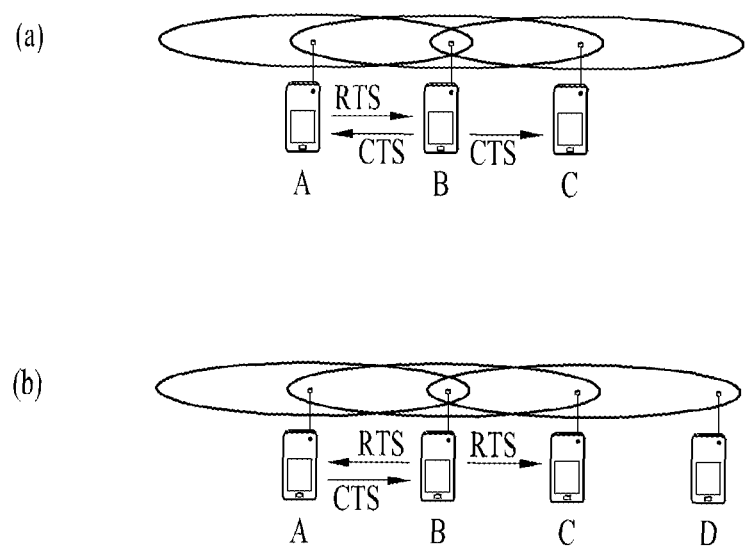
FIG. 8 is a view referred for describing Request To Send (RTS) and Clear To Send (CTS)

FIG. 8 is a view referred to for describing Request To Send (RTS) and Clear To Send (CTS).

In order to efficiently utilize the collision avoidance mechanism in the exemplary situation of FIG. 7, a short signaling packet such as RTS and CTS may be used. RTS/CTS between two STAs may be overheard by neighboring STA(s) so that the neighboring STA(s) may consider whether information is transmitted between the two STAs. For example, if an STA that wants to transmit data transmits an RTS frame to a receiving STA, the receiving STA may indicate that it will receive data by transmitting a CTS frame to adjacent STAs.

FIG. 8(a) illustrates an exemplary method for solving the hidden node problem. In FIG. 8(a), it is assumed that each of STA A and STA C is ready to transmit data to STA B. If STA A transmits an RTS frame to STA B, STA B transmits a CTS frame to its adjacent STAs, STA A and STA C. As a result, STA C should wait until STA A and STA B completely transmit data, thereby avoiding collision.

FIG. 8(b) illustrates an exemplary method for solving the exposed node problem. As STA C overhears RTS/CTS transmission between STA A and STA B, STA C may determine that no collision will occur even though it transmits data to another STA (for example, STA D). That is, STA B transmits an RTS frame to all of its adjacent STAs, and only STA A having transmission data may transmit a CTS frame. STA C receives only the RTS frame without receiving the CTS frame from STA A. Therefore, STA A may be aware that it is located outside the carrier sensing range of STA C.

Frame Structure

Figure 9:
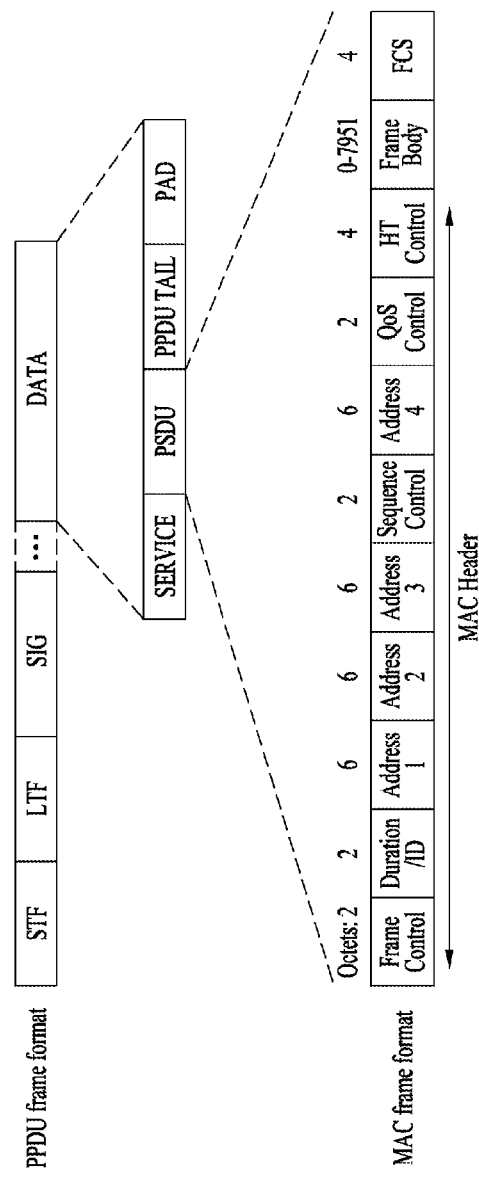
FIG. 9 illustrates an exemplary frame structure for use in an IEEE 802.11 system.

FIG. 9 is a view referred to for describing an exemplary frame structure in the IEEE 802.11 system.

A Physical Layer Convergence Protocol (PLCP) Protocol Data Unit PPDU) frame format may include a Short Training Field (STF), a Long Training Field (LTF), a SIGNAL (SIG) field, and a Data field. The most basic (e.g., a non-High Throughput (non-HT)) PPDU frame may include only a Legacy-STF (L-STF), a Legacy-LTF (L-LTF), a SIG field, and a Data field. Additional (or other types of) STF, LTF, and SIG fields may be included between the SIG field and the Data field according to the type of a PPDU frame format (e.g., an HT-mixed format PPDU, an HT-greenfield format PPDU, a Very High Throughput (VHT) PPDU, etc.).

The STF is used for signal detection, Automatic Gain Control (AGC), diversity selection, fine time synchronization, etc. The LTF is used for channel estimation, frequency error estimation, etc. The STF and the LTF may be collective referred to as a PLCP preamble which is a signal for OFDM PHY layer synchronization and channel estimation.

The SIG field may include a RATE field and a LENGTH field. The RATE field may include information about a modulation scheme and coding rate of data. The LENGTH field may include information about the length of the data. The SIG field may further include parity bits, SIG TAIL bits, etc.

The Data field may include a SERVICE field, a Physical layer Service Data Unit (PSDU), and PPDU TAIL bits. When needed, the Data field may further include padding bits. A part of the bits of the SERVICE field may be used for synchronization at a descrambler of a receiver. The PSDU corresponds to a MAC Protocol Data Unit (PDU) defined at the MAC layer and may include data generated/used in a higher layer. The PPDU TAIL bits may be used to return an encoder to a zero state. The padding bits may be used to match the length of the Data filed in predetermined units.

A MAC header includes a Frame Control field, a Duration/Identifier (ID) field, an Address field, etc. The Frame Control field may include control information required for frame transmission/reception. The Duration/ID field may be set to a time for transmitting the frame. For details of Sequence Control, QoS Control, and HT Control subfields of the MAC header, refer to the IEEE 802.11-2012 technical specification.

The Frame Control field of the MAC header may include Protocol Version, Type, Subtype, To DS, From DS, More Fragment, Retry, Power Management, More Data, Protected Frame, and Order subfields. For the contents of each subfield in the Frame Control field, refer to the IEEE 802.11-2012 technical specification.

A Null-Data Packet (NDP) frame format is a frame format that does not include a data packet. In other words, the NDP frame format includes only a PLCP header part (i.e., the STF, LTF, and SIG fields) of the general PPDU frame format, without the remaining part (i.e., the Data field) of the general PPDU frame format. The NDP frame format may be referred to as a short frame format.

Sub 1 GHz (S1G) Frame Format

Long-range, low-power communication is required to support applications such as M2M, Internet of Things (IoT), smart grid, etc. For this purpose, a communication protocol using a channel bandwidth of 1/2/4/8/16 MHz in a frequency band of 1 GHz or below (Sub 1 GHz: S1G) (e.g., 902 to 928 MHz) is under discussion.

Three types of formats are defined for an S1G PPDU. They are a short format used in a bandwidth of S1G 2 MHz or above, a long format used in a bandwidth of S1G 2 MHz or above, and a format used in a bandwidth of S1G 1 MHz.

Figure 10:
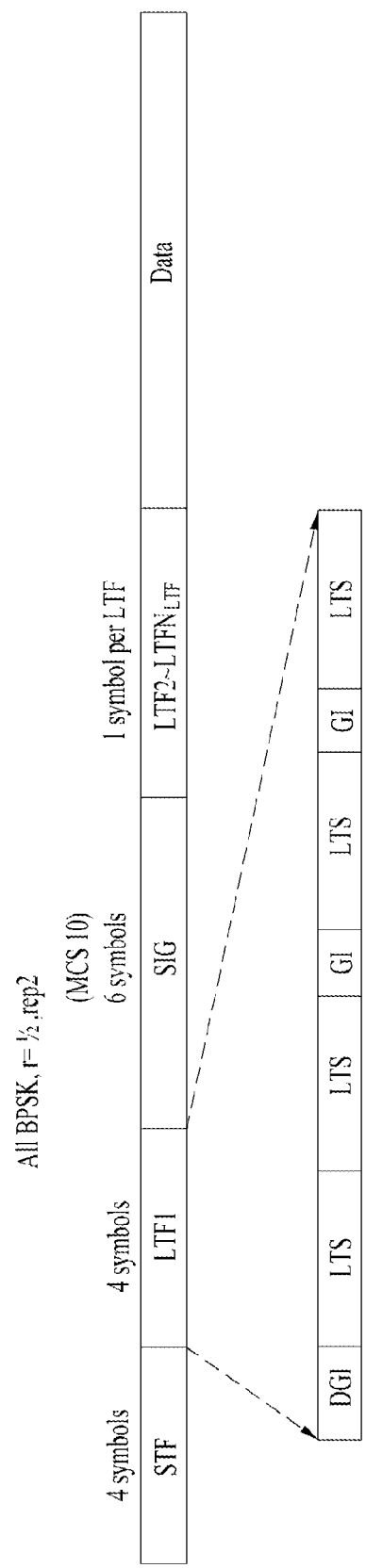
FIG. 10 illustrates an exemplary Sub 1 GHz (S1G) 1 MHz format.

FIG. 10 illustrates an exemplary S1G 1 MHz format.

The S1G 1 MHz format may be used for 1 MHz PPDU Single User (SU) transmission.

Like the Green-field format defined by IEEE 802.11n, the S1G 1 MHz format illustrated in FIG. 10 includes STF, LTF1, SIG, LTF2-LTFN, and Data fields. However, the transmission time of the preamble part of the S1G 1 MHz format is increased by twice or more times through repetition, compared to the Green-field format.

Although the STF field of FIG. 10 has the same periodicity as an STF (a 2-symbol length) of a PPDU in a bandwidth of 2 MHz or above, the STF field is twice repeated in time (rep2) and thus has a 4-symbol length (e.g., 160 µs). Thus 3-dB power boosting may be applied.

The LTF1 field of FIG. 10 is designed to be orthogonal to the LTF1 field (having a 2-symbol length) of the PPDU in the bandwidth of 2 MHz or above in the frequency domain and repeated twice in time, thus having a 4-symbol length. The LTF1 field may include Double Guard Interval (DGI), Long Training Sequence (LTS), LTS, Guard Interval (GI), LTS, GI, and LTS.

The SIG field of FIG. 10 may be iteratively encoded. The SIG field may be configured to be subjected to the lowest Modulation and Coding Scheme (MCS) (i.e. Binary Phase Shift Keying (BPSK)) and repetition coding (rep2), have a rate of ½, and have a 6-symbol length.

LTF2 to LTFN$_{LTF}$ fields of FIG. 10 may be included in case of Multiple Input Multiple Output (MIMO). Each LTF field may be one symbol long.

In the preamble format of the 1-MHz PPDU illustrated in FIG. 10, the STF, LTF1, SIG, and LTF2-LTFN$_{LTF}$ fields correspond to an omni part that is transmitted in all directions and are transmitted without beamforming so that all STAs may receive them.

Figure 11:
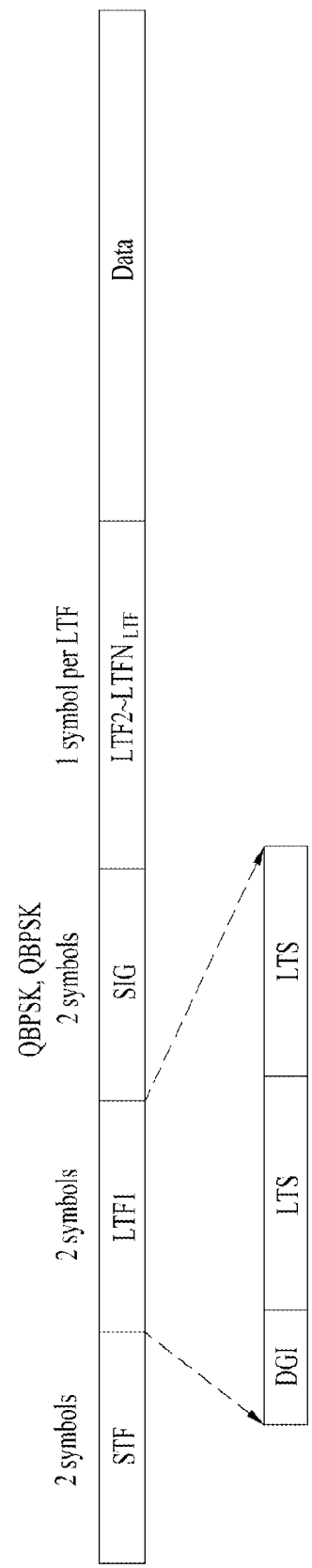
FIG. 11 illustrates an exemplary S1G greater than or equal to 2 MHz short format.

FIG. 11 illustrates an S1G greater than or equal to 2 MHz short format.

The S1G greater than or equal to 2 MHz short format may be used for SU transmission in a PPDU of 2, 4, 8, or 16 MHz.

The STF field of FIG. 11 may have a 2-symbol length.

The LTF1 field of FIG. 11 may have a 2-symbol length, including DGI, LTS, and LTS.

The SIG field of FIG. 11 may be modulated in Quadrature PSK (QPSK), BPSK, etc. as an MCS.

Each of the LTF2 to LTFN$_{LTF}$ fields of FIG. 11 may have a 1-symbol length.

Figure 12:
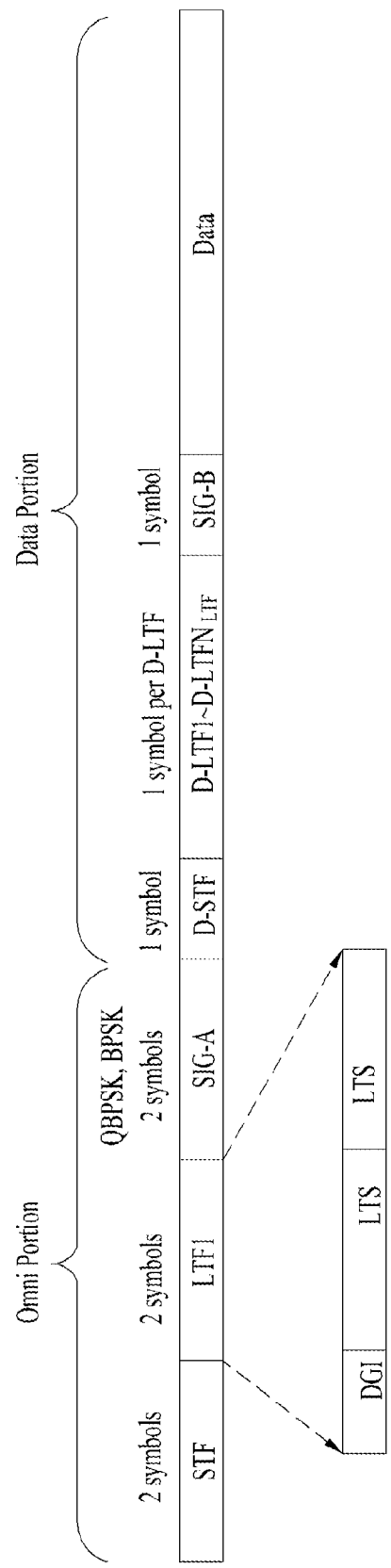
FIG. 12 illustrates an exemplary S1G greater than or equal to 2 MHz long format.

FIG. 12 illustrates an exemplary S1G greater than or equal to 2 MHz long format.

The S1G greater than or equal to 2 MHz long format may be used for MU transmission and SU beamformed transmission in a PPDU of 2, 4, 8, or 16 MHz. The S1G greater than or equal to 2 MHz long format may include an omni part transmitted in all directions and a data part subjected to beamforming.

The omni part may include the STF, LTF1, and SIG-A fields.

The STF field of FIG. 12 may have a 2-symbol length.

The LTF1 field of FIG. 12 may have a 2-symbol length, including DGI, LTS, and LTS.

The SIG-A (SIGNAL-A) field of FIG. 12 may use QPSK, BPSK, etc. as an MCS and have a 2-symbol length.

In the S1G greater than or equal to 2 MHz long format, the data part may include the D-STF, D-LTF, SIF-B, and Data fields. The data part of the PPDU format illustrated in FIG. 12 may be called an MU part. In this sense, the D-STF may be referred to as MU-STF and the D-LTF may be referred to as MU-LTF.

The D-STF (Short Training Field for Data) field of FIG. 12 may have a 1-symbol length.

Each of the D-LTF fields of FIG. 12, that, D-LTF1 to D-LTFN$_{LTF}$ may have a 1-symbol length.

The SIG-B (SIGNAL-B) field of FIG. 12 may have a 1-symbol length.

Each field of the S1G greater than or equal to 2 MHz long formats illustrated in FIGS. 11 and 12 will be described in greater detail.

The STF, LTF1, and SIG-A fields of the omni part may be transmitted in a single stream on each subcarrier. This is expressed as follows.

$$[x_k]_{N_{TX}\times 1}=[Q_k]_{N_{TX}\times 1}d_k \quad \text{[Equation 1]}$$

In [Equation 1], k represents a subcarrier (or tone) index, $x_k$ represents a signal transmitted in subcarrier k, $N_{TX}$ represents the number of transmission antennas, $Q_k$ represents a column vector by which the signal transmitted in subcarrier k is encoded (for example, spatially mapped), and $d_k$ represents data input to an encoder. Cyclic Shift Delay (CSD) may be applied in the time domain to $Q_k$ in [Equation 1]. The time-domain CSD is equivalent to frequency-domain phase rotation or phase shift. Accordingly, $Q_k$ may include a phase shift value for tone k, caused by the time-domain CSD.

If the frame format illustrated in the example of FIG. 12 is used, all STAs may receive the STF, LTF-1, and SIG-A fields and each of the STAs may decode the SIG-A field by channel estimation based on the STF and LTF1 fields.

The SIG-A field may include information about a length/duration, a channel bandwidth, the number of spatial streams, etc. The SIG-A field includes two OFDM symbols. Because one OFDM symbol uses BPSK for 48 data tones, 24-bit information may be represented in the OFDM symbol. Therefore, the SIG-A field may include 48-bit information.

[Table 1] below illustrates examples of bit allocation in the SIG-A field, respectively for SU and MU.

TABLE 1

|  | SU | MU |
|---|---|---|
| SU/MU Indication | 1 | 1 |
| Length/Duration | 9 | 9 |
| MCS | 4 |  |
| BW | 2 | 2 |
| Aggregation | 1 |  |
| STBC | 1 | 1 |
| Coding | 2 | 5 |
| SGI | 1 | 1 |
| GID |  | 6 |
| Nsts | 2 | 8 |
| PAID | 9 |  |
| ACK Indication | 2 | 2 |
| Reserved | 3 | 3 |
| CRC | 4 | 4 |
| Tail | 6 | 6 |
| Total | 48 | 48 |

In [Table 1], an SU/MU Indication field is used to distinguish an SU frame format from an MU frame format.

A Length/Duration field specifies the number of OFDM symbols (or OFDM symbol durations) or the number of bites (i.e., a length) of a frame. In the SU frame, if an Aggregation field is set to 0, the Length/Duration field is interpreted as a Length field. In the MU frame, the aggregation field is not defined. Rather, aggregation is always applied. Therefore, the Length/Duration field is interpreted as a Duration field.

An MCS field indicates a modulation and coding scheme used for PSDU transmission. The MCS field is transmitted in the SIG-A field only in the case of the SU frame. If other STAs (i.e., $3^{rd}$ party STAs (or third STAs) with no direction relation to transmission and reception between the two STAs receive the SU frame, they may calculate the duration of the current received SU frame (i.e., an SU beamformed frame with an Aggregation field set to 0) based on the length value of the Length/Duration field and the value of the MCS field. Meanwhile, the MCS field is included in an SIG-B field carrying user-specific information, not in the SIG-A field and thus an independent MCS may be applied to each user, in the MU frame.

A BW field indicates the channel bandwidth of the transmitted SU frame or MU frame. For example, the BW field may be set to one of values indicating 2, 4, 8, and 16 or 8+8 MHz.

The Aggregation field indicates whether PSDUs are aggregated in the form of an aggregated MPDU (i.e., an A-MPDU). If the Aggregation field is set to 1, this means that PSDUs are aggregated in the form of an A-MPDU. If the Aggregation field is set to 0, this means that PSDUs are transmitted without aggregation.

An STBC field indicates whether STBC is applied to the SU frame or the MU frame.

A Coding field indicates a coding scheme used for the SU frame or the MU frame. A Binary Convolutional Code (BCC) scheme or a Low Density Parity Check (LDPC) scheme may be used for the SU frame. On the other hand, since an independent coding scheme is applicable to each user in the MU frame, the Coding field may be defined to have a bit size of 2 or more bits.

A Short Guard Interval (SGI) field indicates whether a short GI is used for PSDU transmission in the SU frame or the MU frame. In the MU frame, if an SGI is used, it may be indicated that the SGI is applied commonly to all users of an MU-MIMO group.

A Group ID (GID) field provides multi-user group information in the MU frame. In the SU frame, there is no need for defining a user group. Therefore, the GID field is not included in the SIG-A field.

A Number of space-time streams (Nsts) field specifies the number of spatial streams in the SU frame or the MU frame. In the MU frame, the Nsts field indicates the number of spatial streams for each of the STAs of a corresponding multi-user group. For this purpose, eight bits are required. Specifically, since one MU group may include up to four users and up to four spatial streams may be transmitted to each user, eight bits are needed to support this reliably.

A Partial AID (PAID) field indicates an STA ID that identifies a receiving STA in the SU frame. In a UL frame, the value of a PAID is configured as a part of a Basic Service Set ID (BSSID). In a DL frame, the value of a PAID is the result of hashing the AID of an STA. For example, the BSSID may be 48 bits long, the AID may be 16 bits long, and the PAID may be 9 bits long.

In addition, the PAID may be set to the result of hashing a part of the BSS ID in the UL frame. In the DL frame, the PAID may be set to the result of hashing a part of the AID and a part of the BSSID.

In [Table 1], an ACK indication field indicates the type of the next ACK to be transmitted in the SU frame or the MU frame. For example, if the ACK indication field is set to 00, this indicates Normal ACK. If the ACK indication field is set to 01, this indicates Block ACK. If the ACK indication field is set to 10, this indicates No ACK. However, the ACK indication field is not limited to the three types. Rather, the ACK indication field may distinguish three or more types depending on the property of a response frame.

While not shown in [Table 1], a DL/UL indication field (for example, one bit) indicating explicitly whether the frame is a DL frame or a UL frame may further be included. The DL/UL indication field is defined only for the SU frame, not for the MU frame. The DL/UL indication field may be predefined only to indicate a DL frame. Or the DL/UL indication field may be included irrespective of the types of the SU frame and the MU frame.

Meanwhile, the SIG-B field may include user-specific information in the MU frame illustrated in the example of FIG. 12. [Table 2] below illustrates exemplary fields of the SIG-B field in the MU frame. Further, [Table 2] illustrates various exemplary parameters applied to a PPDU for each bandwidth (BW) of 2, 4, 8, and 16 MHz.

TABLE 2

|  | BW | | | |
|---|---|---|---|---|
|  | 2 MHz | 4 MHz | 8 MHz | 16 MHz |
| MCS | 4 | 4 | 4 | 4 |
| Tail | 6 | 6 | 6 | 6 |
| CRC | 8 | 8 | 8 | 8 |
| Reserved | 8 | 9 | 11 | 11 |
| Total | 26 | 27 | 29 | 29 |

In [Table 2], an MCS field indicates an MCS value for a PPDU transmitted in the form of an MU frame for each user.

A TAIL bit may be used to return an encoder to a zero state.

A Cyclic Redundancy Check (CRC) field may be used for error detection at an STA that receives an MU frame.

Method for Selecting Bandwidth for S1G Immediate Response Frame

The present invention proposes a method for selecting a bandwidth for an immediate response frame in a WLAN system operating in a S1G frequency band (e.g., in 902 to 928 MHz).

When a transmitting STA transmits a control frame or a data frame and an STA receiving the data frame transmits a response frame after a Short Inter Frame Space (SIFS), the response frame is referred to as an immediate response frame.

The SIFS is determined to be aRxRFDelay+aRxPLCP-Delay+aMACProcessingDelay+aRxTxTurnaroundTimer. aRxRFDelay represents Radio Frequency Propagation Delay, aRxPLCPDelay represents PLCP Reception Delay, aMACProcessingDelay represents Processing Delay for event handling at the MAC layer, and aRxTxTurnaround-Timer represents Turnaround Time needed to switch from Reception (Rx) mode to Transmission (Tx) mode.

The following operation may be taken as an example of immediate responding. A transmitting STA may transmit a data frame, and upon successful reception of the data frame, a receiving STA may transmit an ACKnowledgement (ACK) frame after an SIFS. Further, the transmitting STA may transmit an RTS frame and the receiving STA may transmit a CTS frame after an SIF in response to the RTS frame. The transmitting STA may also transmit a Power Save Poll (PS-Poll) frame and the receiving STA may transmit an ACK frame or a buffered data frame after an SIFS in response to the PS-Poll frame.

The immediate responding scheme will be described in greater detail, taking an ACK process as an example.

Figure 13:
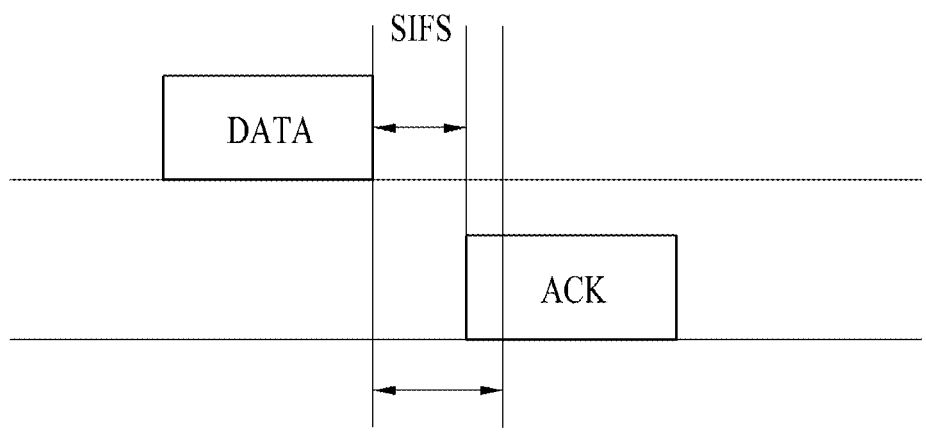
FIG. 13 illustrates an ACKNowledgement (ACK) procedure.

FIG. 13 illustrates an ACK process.

After transmitting a PDU requiring an ACK frame as a response, an STA waits for a time interval of ACKTimeout. ACKTimeout may be determined based on aSIFSTime+ aSLotTime+aPHY-RX-START-Delay, starting with a value of a PHY-TXEND.confirm primitive. aSIFSTime is a nominal time required for receiving the last symbol of a frame in the air interface, processing the frame, and transmitting the first symbol of a response frame as early as possible in the air interface at the PHY layer. aSlotTime is a time unit used at the MAC layer, to define a Point Coordination Function (PCF) InterFrame Space (PIFS) and a DIFS. aPHY-RX-START-Delay is a delay time until a PHY-RXSTART.indication primitive is issued. The PHY-RXSTART.indication primitive is a primitive by which the PHY layer notifies the MAC layer that it has started to receive a PPDU having a valid PLCP header.

In FIG. 13, ACKTimeout is simply expressed as SIFS+ Slot Time+PHY-RX-START-Delay. That is, it may be said that ACKTimeout is a time needed for an STA receiving a data frame to transmit an ACK frame after an SIFS. ACK-Timeout may be calculated in consideration of Slot Time.

Slot Time is determined to be aCCATime+aRxTxTurnarunTime+aAirPropagationTime+aMACProcessingDelay. aCCATime is a maximum time during which a medium is accessible within every time slot to determine whether the medium is busy or idle according to the CCA mechanism. aRxTxTurnaroundTimer is a turnaround time needed to switch from the Rx mode to the Tx mode. aAirPropagation-Time is a time twice longer than a time taken to propagate a signal over a maximum distance to the remotest of available slot-synchronized STAs. aMACProcessingDelay is a processing delay for event handling at the MAC layer.

Among factors that determine ACKTimeout, PHY-RX-START-Delay is a time for determining whether an immediate response frame such as an AC frame has been triggered successfully. In general, PHY-RX-START-Delay reflects a time until an SIG field of a PLCP header is decoded.

That is, a maximum time taken for a PLCP header of an ACK frame transmitted by a receiving STA to arrive at a transmitting STA on the assumption that the transmitting STA transmits a DATA frame and the receiving STA successfully receives the DATA frame is used as ACKTimeout.

If the PHY-RXSTART.indication primitive is not generated during the ACKTimeout interval, the STA determines that the MPDU transmission has been failed and invokes a backoff process upon expiration of the ACKTimeout interval.

If the PHY-RXSTART.indication primitive is generated during the ACKTimeout interval, the STA may wait for a PHY-RXEND.indication primitive and determine whether the MPDU transmission has been successful. The PHY-RXEND.indication primitive is a primitive by which the PHY layer notifies the MAC layer of completion of current PSDU reception.

If the STA recognizes a valid ACK frame transmitted by the MPDU receiving side, corresponding to the PHYRX-END.indication primitive, the STA interprets the ACK as a successful ACK. Accordingly, an ongoing specific frame sequence may be allowed to continue or may be terminated without retry according to a method suitable for the frame sequence.

If the STA recognizes any other frame including another valid frame, the STA interprets this as failure of the MPDU transmission. In this case, the STA should invoke the backoff process in the PHY-RXEND.indication primitive and process the receiver frame. Exceptionally, if the STA recognizes a valid ACK frame transmitted by a PS-Poll frame receiving side, the STA may allow this as a successful ACK for the PS-Poll frame.

In summary, while the STA, which has transmitted the data frame, waits for an ACK that the STA receiving the data frame will transmit, if a PHY-RXSTART.indication primitive is not generated during ACKTimeout, the STA performs a recovery process (i.e. a process of attempting retransmission of the data frame by performing the backoff process again), determining that the transmission has been failed.

As illustrated in FIG. 13, PHY-RX-START-Delay is considered in determining an ACKTimeout value. PHY-RX-START-Delay may vary depending on the channel bandwidth of a frame. For example, PHY-RX-START-Delay may be different in the S1G 1 MHz frame format illustrated in FIG. 10 from in the S1G greater than or equal to 2 MHz format illustrated in FIG. 11 or FIG. 12.

To compare PHY-RX-START-Delay lengths according to channel bandwidths, it is assumed that PHY-RX-START-Delay is a time taken until the SIG field of a PLCP header is decoded.

The STF, LTF1, and SIG fields of the PLCP header of a 1-MHz PPDU includes a total of 14 OFDM symbols. If the slot time of one OFDM symbol is about 40 µs, PHY-RX-START-Delay may be about 560 µs (=14×40 µs) for the 1-MHz PPDU.

On the other hand, the STF, LTF1, and SIG fields of the PLCP header of a PPDU equal to or greater than 2 MHz (i.e., a 2, 4, 8, or 16-MHz PPDU) includes a total of 6 OFDM symbols. Therefore, PHY-RX-START-Delay may be about 240 µs (=6×40 µs) for the 2-MHz PPDU.

Accordingly, ACKTimeout needs to be set differently depending on whether an immediate response frame is transmitted in a 1-MHz PPDU or a PPDU equal to or greater than 2 MHz. For example, if the receiving STA transmits a 1-MHz PPDU as an immediate response frame, it is necessary to set a larger ACKTimeout value for the transmitting STA than for the receiving STA, compared to a PPDU equal to or greater than 2 MHz.

If one fixed ACKTimeout value is used irrespective of the channel bandwidth of an immediate response frame, PHY-RX-START-Delay should be set to at least 560 µs (or 560 µs+a delay margin) as a default value. In this case, if the receiving STA transmits a PPDU equal to or greater than 2 MHz as an immediate response frame, ACKTimeout is set in consideration of 560 µs required for the transmitting STA to decode up to the SIG field of the immediate response frame, thereby causing no problem. However, if the receiving STA transmits a 1-MHz PPDU as an immediate response frame, ACKTimeout is set in further consideration of unnecessary 320 µs in addition to the time required for the transmitting STA to decode up to the SIG field of the immediate response frame. In this case, a time waste or unnecessary time delay of about 320 µs is generated in the recovery process (or backoff process) after the transmission failure of the transmitting STA. As a result, inefficiency occurs in terms of overall throughput and energy consumption.

If one backoff slot time is 52 µs in the backoff process, the unnecessary overhead of 320 µs corresponds to a difference of 6 for a backoff timer (or a backoff count). Therefore, it is a very large time delay from the viewpoint of channel access efficiency of an STA.

Accordingly, the present invention proposes a method for selecting a channel bandwidth for an immediate response frame and an immediate responding based on the channel bandwidth selection method in a system supporting two or more types of channel bandwidths.

Support of two or more types of channel bandwidths in the present invention means that different information bits are transmittable during a unit time (for example one OFDM symbol duration) in each channel bandwidth on the assumption of the same MCS. Or support of two or more types of channel bandwidths in the present invention means that the unit time (for example, one OFDM symbol duration) is same for each channel bandwidth. Therefore, down-clocking of a 20-MHz channel bandwidth to 1/10 or 1/20 is not included in support of two or more types of channel bandwidths.

In addition, a frame triggering an immediate response frame is referred to as an immediate trigger frame in the present invention. As in the foregoing example, the immediate trigger frame may be a data frame, an RTS frame, or a PS-Poll frame, which has a normal ACK policy. In this case, an immediate response frame may be an ACK frame, a CTS frame, or a data frame.

An STA transmitting an immediate trigger frame may set an immediate response frame at the moment of completing the transmission. That is, after transmitting the immediate trigger frame, the transmitting STA may activate the immediate response timer during a time period calculated by aSIFSTime+aSlotTime+aPHY=RX-START-Delay from a time when a PHY-TXEND.confirm primitive.

If a PHY-RXSTART.indication primitive has not been generated until before timeout of the immediate response timer, the transmitting STA may perform the recovery process (or the backoff process), considering that the receiving STA has not transmitted an immediate response frame.

As described before, the immediate trigger frame is transmitted in one of two or more PPDU types having different PHY-RX-START-Delay values according to channel bandwidths.

For example, it is assumed that a PPDU using a first channel bandwidth (for example, 1 MHz) has A as a PHY-RX-START-Delay value and a PPDU using a second channel bandwidth, a third channel bandwidth, etc. (for example, 2 MHz, 4 MHz, etc.) has B as a PHY-RX-START-Delay value. It is also assumed that A and B are set to different values and A is larger than B.

According to the present invention, a channel bandwidth should be determined for a PPDU to be used as an immediate response frame in such a manner that a PHY-RX-START-Delay value determined based on the PPDU to be used as the immediate response frame on the part of the receiving STA is equal to or less than a PHY-RX-START-Delay value determined based on a PPDU of a received immediate trigger frame.

For example, if the transmitting STA transmits an immediate trigger frame using the first channel bandwidth, the receiving STA may reply with an immediate response frame using the first channel bandwidth.

If the transmitting STA transmits an immediate trigger frame using the second or third channel bandwidth, the receiving STA should not use the first channel bandwidth in replying with an immediate response frame because on the part of the receiving STA, the channel bandwidth of a PPDU to be used as an immediate response frame should be determined so that the PHY-RX-START-Delay value determined based on the PPDU to be used as the immediate response frame may be equal to or less than the PHY-RX-START-Delay value B determined based on a PPDU of a received immediate trigger frame. If upon receipt of the immediate trigger frame using the second or third channel bandwidth, the transmitting STA transmits an immediate response frame using a PPDU of the second or third channel bandwidth, the PHY-RX-START-Delay value is equal to B, thus causing no problem. If the transmitting STA transmits the immediate response frame using a PPDU of the first channel bandwidth, the PHY-RX-START-Delay value is A larger than B.

In addition, if an immediate response frame is transmitted using a PPDU of a channel bandwidth having the same PHY-RX-START-Delay value (for example, the second channel bandwidth, the third channel bandwidth, etc.), the channel bandwidth of the immediate response frame should be equal to or less than the channel bandwidth o an immediate trigger frame.

If the receiving STA follows the above rule in selecting a channel bandwidth for an immediate response frame, an immediate response timeout value is set to aSIFSTime+aSlotTime+aPHY-RX-START-Delay. Herein, aPHY-RX-START-Delay is set to the aPHY-RX-START-Delay value of an immediate trigger frame transmitted by the transmitting STA. This implies that the immediate response timeout value may vary depending on the channel bandwidth of the immediate trigger frame transmitted by the transmitting STA.

An exemplary case in which the immediate responding process defined in the present invention is applied to an S1G WLAN system (or a system conforming to the IEEE 802.11ah standard) will be described below.

After transmitting an MPDU requiring an ACK frame as a response, an STA waits for an ACKTimeout interval. ACKTimeout may be determined based on aSIFSTimeout+ aSlotTime+aPHY-RX-START-Delay, starting with a value of a PHY-TXEND.confirm primitive.

Herein, aPHY-RX-START-Delay is determined based on a CH_BANDWIDTH (or preamble type) parameter of TXVECTOR. If the CH_BANDWIDTH parameter of TXVECTOR corresponds to (duplicated) 1 MHz, aPHY-RX-START-Delay is set to 601 μs. If the CH_BANDWIDTH parameter of TXVECTOR corresponds to (duplicated) 2 MHz/4 MHz/8 MHz/16 MHz, aPHY-RX-START-Delay is set to 281 μs.

An S1G STA, which transmits a control frame (i.e., a response frame) in response to a frame transmitted in an S1G PPDU, may set the TXVECTOR parameter CH_BANDWIDTH to indicate the same channel bandwidth as indicated by an RXVECTOR parameter CH_BANDWIDTH of a frame eliciting the response frame.

The S1G STA is not allowed to transmit a 1-MHz preamble as a response to a preamble equal to or greater than 2 MHz (a preamble ≥2 MHz).

Figure 14:
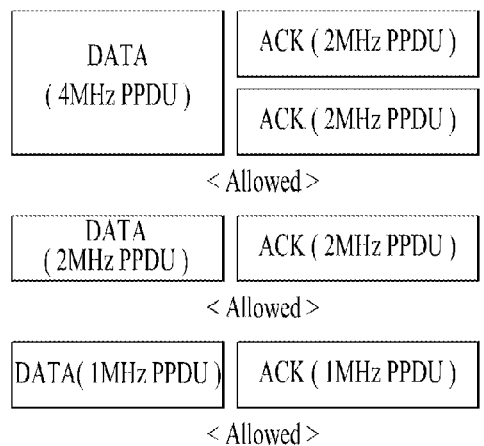
FIG. 14 is an exemplary view referred to for describing whether a frame exchange sequence is allowed or not according to the present invention.
Figure 14:
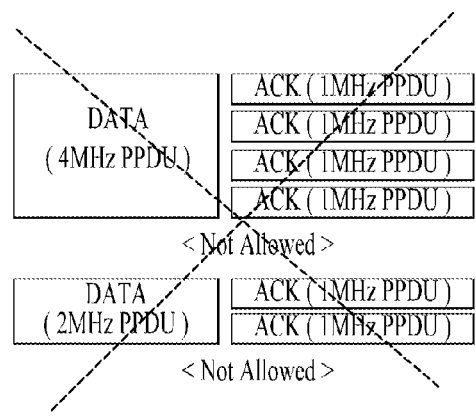

FIG. 14 is a view referred to for describing whether a frame exchange sequence is allowed or not according to an example of the present invention.

In FIG. 14, an operation for receiving an ACK frame after a data frame is transmitted is illustrated. FIG. 14(a) illustrates examples in which reception of an ACK frame is allowed and FIG. 14(b) illustrates examples in which reception of an ACK frame is not allowed.

Referring to FIG. 14(a), reception of ACK frames in duplicated 2-MHz PPDUs is allowed after transmission of a data frame in a 4-MHz PPDU. Also, reception of an ACK frame in a 2-MHz PPDU is allowed after transmission of a data frame in a 2-MHz PPDU. Further, reception of an ACK frame in a 1-MHz PPDU is allowed after transmission of a data frame in a 1-MHz PPDU.

Referring to FIG. 14(b), reception of ACK frames in duplicated 1-MHz PPDUs is allowed after transmission of a data frame in a 4-MHz PPDU. Also, reception of ACK frames in duplicated 1-MHz PPDUs is allowed after transmission of a data frame in a 2-MHz PPDU.

When an STA transmits a 2-MHz or 4-MHz data frame, the STA expects a PPDU having a 2-MHz preamble as a response frame, calculates a timeout value, considering aPHY-RX-START-Delay to be about 281 μs, and receives and processes the response frame according to the timeout value.

If the STA receives a response frame in a PPDU having a 1-MHz preamble in response to a 2-MHz or 4-MHz data frame as illustrated in FIG. 14(b), the STA should calculate a timeout value for decoding the response frame successfully based on aPHY-RX-START-Delay of about 601 μs. However, the transmitting STA calculates a timeout value based on aPHY-RX-START-Delay of about 281 μs and receives and processes the response frame. As a result, the transmitting STA may not receive the response frame successfully.

In the foregoing various examples of the present invention, values such as 601 μs and 281 μs for aPHY-RX-START-Delay are purely exemplary, for illustrative purposes. Therefore, the scope of the present invention is not limited to these specific values.

VCS Mechanism

A CS mechanism is used for channel access. The CS mechanism refers to an operation for determining the busy/idle state of a channel.

In a conventional NAV setting method, an STA determines that another STA is using a channel during a specific time period based on the value of a Duration field of a frame received from the other STA and operates accordingly (i.e., the STA does not attempt to access the medium during the specific time period). This operation may be referred to as a Virtual Carrier Sense (VCS) mechanism in the sense that (even though the medium is physically idle), it is like determining that the medium is occupied as a result of CS, compared to determining whether the medium is busy or idle by physical CS.

For example, if the CRC of a received frame is not valid, $3^{rd}$ party STAs other than a destination STA, the $3^{rd}$ party STAs determine that there is an error in the received frame. The STAs receiving the erroneous frame wait for an Extended Inter-Frame Space (EIFS) and if the channel is idle, resume the backoff process. The EIFS is generally calculated based on aSIFSTime+DIFS+ACKTxTime.

ACKTxTime is a time required for an STA to transmit an ACK frame. According to the afore-described method for selecting a bandwidth for a response frame according to the present invention, the channel bandwidth of an ACK frame is determined according to the channel bandwidth of a frame triggering the ACK frame (e.g., an immediate trigger frame). For example, if the immediate trigger frame has a preamble type of 2 MHz or above, an immediate response frame is not allowed to have a 1-MHz preamble type. Further, the channel bandwidth type of the preamble of the immediate response frame is set to the same as the channel bandwidth type of the preamble of the immediate trigger frame.

Therefore, upon receipt of the erroneous frame, the $3^{rd}$ party STAs should check the channel bandwidth of the received frame in order to defer channel access during the EIFS. If an error has occurred in a PPDU received in the first channel bandwidth, ACKTxTime of the EIFS is calculated based on the assumption of aPHY-RX-START-Delay for the same channel bandwidth as the first channel bandwidth (as described before, aPHY-RX-START-Delay is a time for determining whether the immediate response frame such as an ACK frame has been triggered successfully and generally reflects a time taken for decoding up to the SIG field of a PLCP header).

This is because an ACK frame for a PPDU received in the first channel bandwidth is transmitted in the first channel bandwidth and aPHY-RX-START-Delay for the first channel bandwidth should be applied to the ACK frame. If an error has occurred in a PPDU received in the second or third channel bandwidth other than the first channel bandwidth, ACKTxTime of the EIFS is calculated based on the assumption of aPHY-RX-START-Delay for the second or third channel bandwidth.

If the CRC of the received frame is valid, the $3^{rd}$ party STAs other than the destination STA of the frame consider that the frame is error-free. Then the STAs set a NAV to a time corresponding to a value indicated by the duration field of the MAC header of the received frame. The duration field of the MAC header of a frame is set to a value indicating a frame transmission time for protecting the next transmission frame(s).

Meanwhile, the duration field is not included in the MAC header to reduce the overhead of the MAC header in the case of a short MAC frame. Therefore, the afore-described method for setting a NAV using a duration field is not viable.

To enable an STA to set an appropriate NAV value in any case in which a short MAC frame or a normal MAC frame is received, there is a need for transmitting information about the next transmission frame(s) in a part other than the MAC header.

Compared to the conventional VCS mechanism in which a NAV value is set based on the duration field of a received frame, the VCS mechanism of the present invention is based on other specific information than the duration field. Thus, a value set based on specific information of a received frame (i.e., a value set to serve a similar purpose to a conventional NAV value) is referred to as a "VCS time length value" in the sense that it is a time period during which a channel is in use, determined as a result of VCS. However, the concept of a VCS time length value in the present invention does not exclude setting of a NAV value based on information other than the duration field.

For example, a NAV value (or a VCS time length value) may be set using a response frame type field of a PLCP SIG field of a frame (this field may be referred to as an ACK indication parameter or a response indication field). For example, since the type of a frame following a specific frame is known based on the response frame type parameter of the frame, if the frame has a duration field, the NAV value (or VCS time length value) may be determined based on an assumed value for the duration field. It is not always necessary to estimate/assume the value of the duration field. Rather, the value of the duration field is described as estimated/assumed in order to help understanding of the present invention, compared to the conventional NAC setting mechanism.

The response frame type parameter may be set to indicate one of types such as No Response, NDP Control Response, Normal Control Response, and Long Response.

Figure 15:
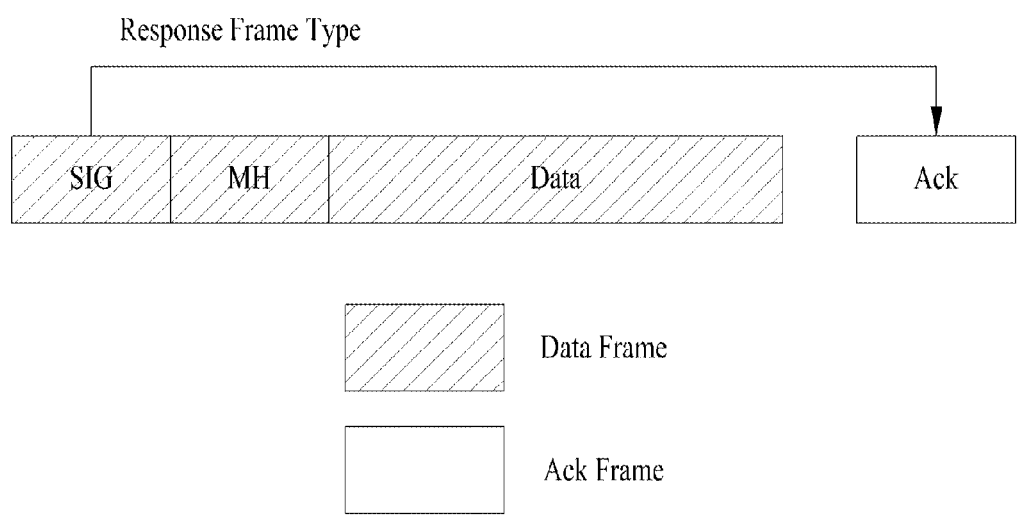
FIG. 15 is a view referred to for describing an example in which a response frame type field of a SIG field of a Physical Layer Convergence Protocol (PLCP) header is used according to the present invention.

FIG. 15 is a view referred to for describing an example of the present invention using a response frame type field of a SIG field in a PLCP header.

In the example of FIG. 15, a response frame type field (or response indication parameter) among information included in a SIG field of a PLCP header of a data frame may be set to a value indicating one of No Response, NDP Control Response, Normal Control Response, and Long Response.

If the response frame type is No Response, a Duration field of a MAC header of a received frame may be expected/assumed to be zero, in the presence of the Duration field. Thus, if the response indication parameter indicates No Response, a NAV value (or a VCS time length value) is set to 0.

If the response frame type is NDP Control Response and the Duration field of the MAC header exists in the received frame, the Duration field is expected/assumed to have a value calculated by PLCP header transmission time+SIFS. Since an NDP frame is a frame including only a PLCP header, the PCLP header transmission time may be expressed as an NDP frame transmission time (i.e., NDPTxTime). Therefore, if the response indication parameter indicates NDP Control Response, the NAV value (or the VCS time length value) is set to NDPTx+aSIFSTime.

If the response frame type is Normal Control Response and the Duration field of the MAC header exists in the received frame, the Duration field is expected/assumed to have a value calculated by CTS/ACK/BlockACK transmission time+SIFS. Since a CTS/ACK/BlockACK frame is a normal frame, the CTS/ACK/BlockACK transmission time may be expressed as a normal frame transmission time (i.e. NormalTxTime). Therefore, if the response indication parameter indicates Normal Control Response, the NAV value (or the VCS time length value) is set to NormalTxTime+aSIFSTime.

If the response frame type is Long Response and the Duration field of the MAC header exists in the received frame, the Duration field is expected/assumed to have a value of up to MAX_PPDU transmission time+SIFS. Therefore, if the response indication parameter indicates Long Response, the NAV value (or the VCS time length value) is set to MaxPPDUTxTime+aSIFSTime.

Although the type of the next transmission frame may be expected/assumed based on response frame type information included in a received frame as described above, the transmission time length of a response frame should be determined to enable a $3^{rd}$ party STA to set a correct NAV value (or VCS time length value). This is because as described before, the transmission time of a frame is different according to a channel bandwidth.

Specifically, to enable the $3^{rd}$ party STA to set the NAV value (or VCS time length value), the transmission time lengths of an MPDU part and a preamble part of the response frame should be determined correctly.

The transmission time length of the MPDU part in the response frame is determined based on the response frame type of a PLCP SIG field of a received frame. For example, if the response frame type indicates one of No Response, NDP Control Response, Normal Control Response, and Long Response, an MPDU value is determined according to the response frame type.

The transmission time length of the preamble part in the response frame is determined by a channel bandwidth. For example, the time length of the preamble part of the response frame is determined differently/separately for a preamble type with a channel bandwidth of 1 MHz and a preamble type with a channel bandwidth equal to or greater than 2 MHz (refer to FIGS. 10, 11, and 12). In addition, the channel bandwidth of the response frame is determined by the channel bandwidth of a frame received by the $3^{rd}$ party STA.

As a consequence, a NAV value (or VCS time length) set by the $3^{rd}$ party STA is determined based on the channel bandwidth of the response frame (or the preamble type of the response frame determined according to the channel bandwidth of the received frame) and the value of the response frame type (or the value of the response indication parameter) included in the PLCP header of the received frame. In other words, the response frame type is determined based on the value of the response frame type field (or the value of the response indication parameter) included in the PLCP header of the frame received by the $3^{rd}$ party STA, the length/type of the preamble is determined by the channel bandwidth of the received frame in the corresponding response frame type, and the NAV value (or VCS time length) is determined, inclusive of a time required for transmitting the response frame, determined based on the length/type of the preamble. Accordingly, the $3^{rd}$ party STA may set the NAV value (or VCS time length) correctly without identifying the type of the received frame (e.g., a short MAC frame or any other frame (i.e., with or without the Duration field)).

In implementing the above-described VCS mechanism, an STA may design a protocol using one parameter (e.g., a NAC value (or a VCS time length)) or by separating parameters according to what information is used to determine the VCS time length (e.g., the Duration field of a MAC header or the response frame type field of a PLCP header). While the VCS mechanism is described as implemented using one parameter (i.e., a NAC value of a VCS time length) in the foregoing example of the present invention, setting of the NAV value based on the value of the Duration field as is done conventionally and additional setting of the additional VCS time length based on the value of the response frame type field (or a channel bandwidth) is also included in the embodiment of the present invention.

Method for Determining 3$^{rd}$ Party STA

In the case of a short MAC frame, an AID may be used instead of a MAC address in a part of a Receiver Address (RA) field or a Transmitter Address (TA) field in order to reduce the overhead of a MAC header (an AID is a local ID assigned to an associated STA by an AP). For example, the MAC address of the AP is included in the RA (e.g., an Address 1 (A1) field) and the AID of the corresponding STA is included in the TA (e.g., an Address 2 (A2) field) in the MAC header of a DL short MAC frame that the AP transmits to the STA. Since the MAC address is 6 bytes long and the AID is 2 octets long, the overhead of the MAC header may be reduced by the difference.

STAs receiving the short MAC frame determines whether to set a NAV value (or VCS time length) depending on whether the STAs are a destination STA of the frame. If the CRC of the received frame is valid, 3$^{rd}$ party STAs other than the destination STA consider that the received frame is free of an error and set the NAC value (or VCS time length).

Upon receipt of a frame, an STA should determine whether it is a destination STA of the frame.

If the RA of a short MAC frame received by the STA is a MAC address, the STA compares the MAC address with its MAC address. If the MAC addresses are identical, the STA may determine that it is the destination STA. Otherwise, the STA may determine that it is a 3$^{rd}$ party STA.

If the RA of the received short MAC frame is an AID, the STA compares the AID with its AID. If the AIDs are different, the STA may determine that it is a 3$^{rd}$ party STA.

Meanwhile, even though the AIDs are identical, the STA should not determine that it is the destination STA because if different APs assign the same AIDs, the frame may be destined for another STA. Therefore, if the RA of the received short MAC frame is an AID, the STA compares the AID with its AID. If the AIDs are identical, the STA compares the TA of the short MAC frame with the MAC address of its associated AP. If the TA of the received short MAC frame is identical to the MAC address of the associated AP, the STA may determine that it is the destination STA and otherwise, the STA may determine that it is a 3$^{rd}$ party STA.

If the STA receives the short MAC frame without association with any AP (i.e., in a pre-association state), the above-described method for determining whether the STA is the destination STA based on the RA set to an AID and the TA set to a MAC address is not viable. This is because a short MAC frame (i.e., a MAC frame with one of an RA field and a TA field set to an AID) may not be transmitted to a non-associated STA. Therefore, if the STA receives the short MAC frame in the pre-association state, the STA should determine that it is not the destination STA but a 3$^{rd}$ party STA.

If an STA receiving a frame determines that it is a 3$^{rd}$ party STA, the STA may set a NAV value (or a VCS time length) according to a specific field of the received frame, as described before in the present invention.

Further, when an STA determines whether it is an STA to transmit an immediate response frame (i.e., an ACK frame transmitted in response to a short MAC data frame), the STA may also follow the foregoing 3$^{rd}$ party STA determination method. For example, if the RA of the received short MAC data frame is identical to the AID of the STA, the STA may compare the TA of the short MAC data frame with the MAC address of its associated AP. Only when the TA is identical to the MAC address, the STA may transmit an immediate response frame, determining that it is a destination STA.

Figure 16:
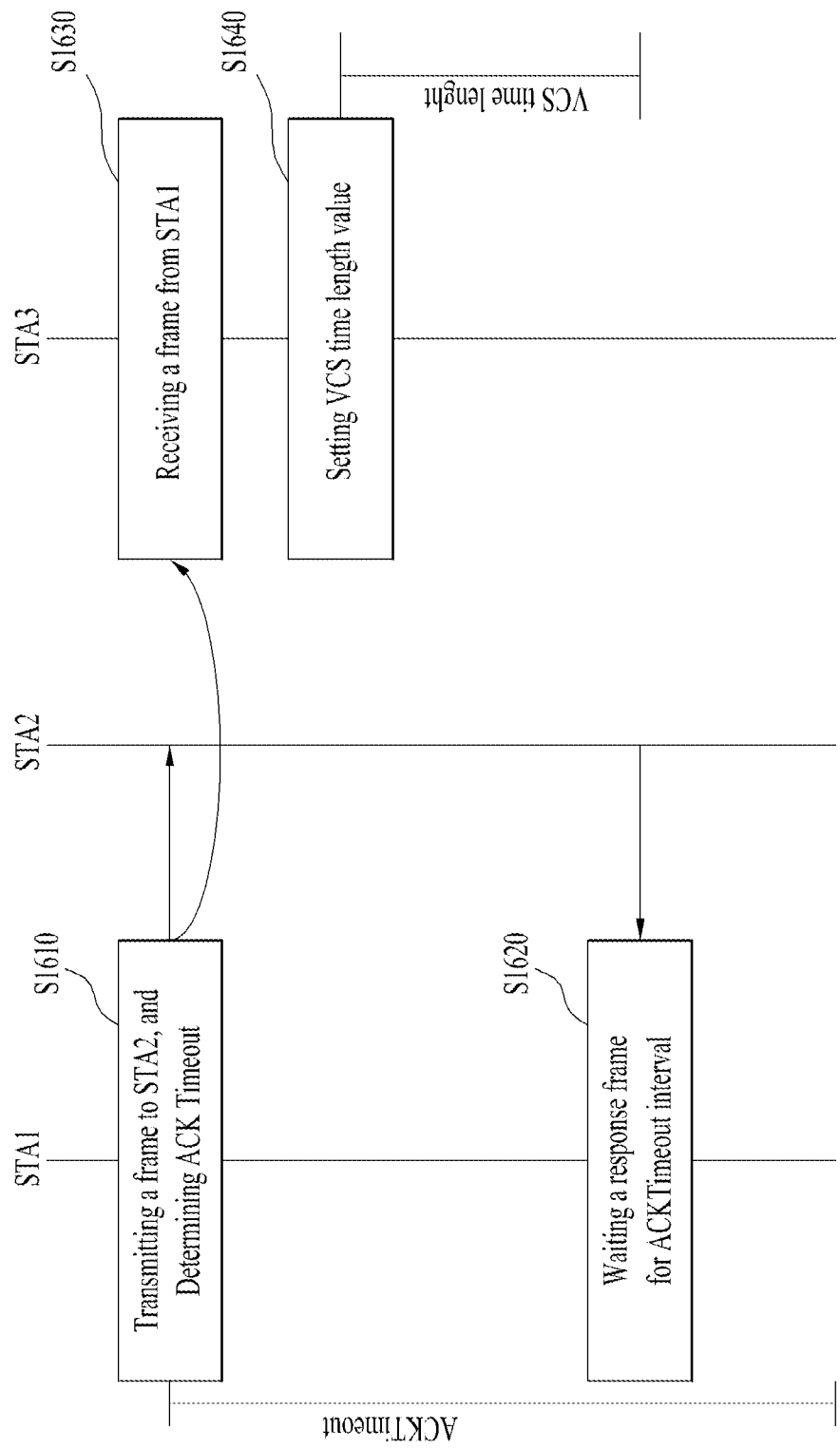
FIG. 16 is a diagram illustrating a signal flow for an exemplary method according to the present invention.

FIG. 16 is a view referred to for describing a method according to an example of the present invention.

In the example of FIG. 16, an operation of a first STA (STA1) is related to the afore-described method for selecting a bandwidth for an S1G immediate response frame (or the responding process) according to the present invention. An operation of a third STA (STA3) is about the VCS mechanism of the present invention. For the convenience of description, one drawing is referred to but the operations of the STAs may be understood as separate ones.

In step S1610, STA1 may transmit a frame to a second STA (STA2). This frame may be an immediate trigger frame transmitted in the immediate responding method. Upon receipt of the frame from STA1, STA2 may transmit a response frame (e.g., an immediate response frame).

The channel bandwidth type of the response frame transmitted by STA2 may be set to the channel bandwidth type of the frame transmitted by STA1. Also, if the frame transmitted by STA1 has a preamble type of 2 MHz or above, the response frame transmitted by STA2 may be limited to a type other than a 1-MHz preamble type (i.e., the response frame is not allowed to have the 1-MHz preamble type).

In addition, STA1 may wait for the response frame from STA2 during an ACKTimeout interval in step S1610. A different ACKTimeout interval is determined according to the preamble channel bandwidth type of the frame. That is, since the preamble channel bandwidth of the response frame varies depending on the preamble channel bandwidth of the frame, the ACKTimeout interval may be set in consideration of this.

In step S1620, STA1 may receive a response frame from STA2. In this manner, upon receipt of the response frame within the ACKTimeout interval, it is determined that the frame has been transmitted successfully. Otherwise, STA1 may determine that the frame transmission has been failed and perform the backoff process upon expiration of the ACKTimeout interval (not shown).

Meanwhile, a third party STA (e.g., STA3) may receive the frame transmitted from another STA (e.g., STA1) to a third STA (e.g., STA2) in step S1630.

STA3 may determine a NAV value (or a VCS time length) based on a response indication parameter (or a response frame type field) of the received frame in step S1640. STA3 may defer channel access within the NAV value (or the VCS time length).

The channel bandwidth type means the channel bandwidth type of a response frame. The channel bandwidth type of the response frame may be set to the channel bandwidth type of the frame (e.g., the frame transmitted from STA1 to STA2).

For example, the NAV value (or the VCS time length) may be basically determined depending on the response indication parameter indicates No Response, Normal Response, NDP Response, or Long Response. In addition, the NAV value (or the VCS time length) may be specified according to the channel bandwidth.

While the exemplary method has been described with reference to FIG. 16 as a series of operations for simplicity of description, this does not limit the sequence of steps. When needed, steps may be performed at the same time or in a different sequence. All of the exemplary steps illustrated in FIG. 16 are not always necessary to implement the method proposed by the present invention.

The foregoing embodiments of the present invention may be implemented independently or one or more of the embodiments may be implemented simultaneously, for the method of FIG. 16.

Figure 17:
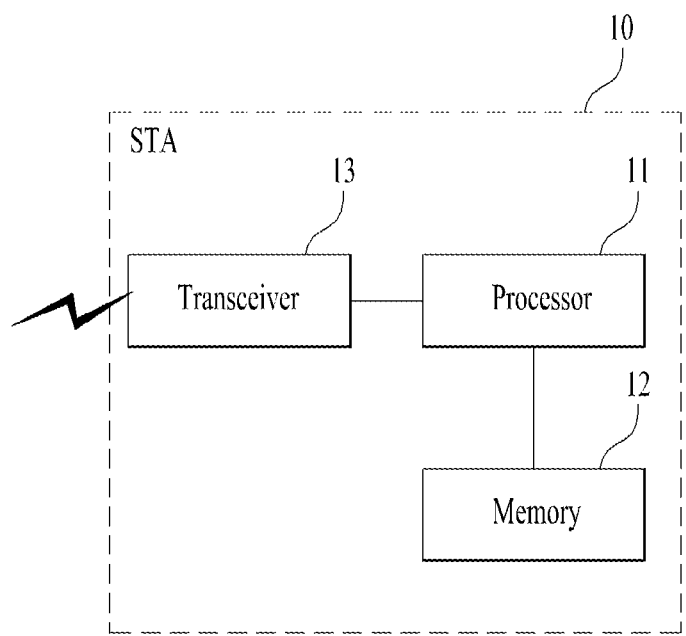
FIG. 17 is a block diagram of a wireless apparatus according to an embodiment of the present invention

FIG. 17 is a block diagram of a wireless apparatus according to a preferred embodiment of the present invention.

An STA 10 may include a processor 11, a memory 12, and a transceiver 13.

The transceiver 13 may be configured to transmit and receive wireless signals and implement a PHY layer, for example, in conformance to an IEEE 802 system. The processor 11 is connected to the transceiver 13 and may implement the PHY layer and/or a MAC layer in conformance to the IEEE 802 system. The processor 11 may be configured to perform operations according to various embodiments of the present invention. In addition, a module for performing the foregoing operations according to various embodiments of the present invention may be stored in the memory 12 and executed by the processor 11. The memory 12 may be included inside or outside the processor 11 and connected to the processor 11 by a known means.

The STA 10 of FIG. 17 according to the example of the present invention may be configured to perform the responding process. The processor 11 may be configured to transmit a frame requesting a response frame to another STA using the transceiver 13. Also, the processor 11 may be configured to wait for the response frame during an ACKTimeout interval. Herein, the ACKTimeout interval may be determined to be a different value depending on the preamble channel bandwidth type of the frame.

According to another example of the present invention, the STA 10 of FIG. 17 may be configured to perform VCS. The processor 11 of a third STA may be configured to receive a frame transmitted from a first STA to a second STA through the transceiver 12. In addition, the processor 11 may be configured to determine a VCS time length based on at least one of a response indication parameter and a channel bandwidth type. The processor 11 may also be configured to defer channel access of the third STA during the VCS time length.

The specific configuration of the above-described apparatus may be implemented so that the foregoing various embodiments of the present invention may be applied independently or two or more of them may be applied simultaneously. To avoid redundancy, the same description is not provided herein.

The embodiments of the present invention may be implemented by various means, for example, in hardware, firmware, software, or a combination thereof.

In a hardware configuration, the method according to the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, or microprocessors.

In a firmware or software configuration, the method according to the embodiments of the present invention may be implemented in the form of modules, procedures, functions, etc. performing the above-described functions or operations. Software code may be stored in a memory unit and executed by a processor. The memory unit may be located at the interior or exterior of the processor and may transmit and receive data to and from the processor via various known means.

The detailed description of the preferred embodiments of the present invention has been given to enable those skilled in the art to implement and practice the invention. Although the invention has been described with reference to the preferred embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

INDUSTRIAL APPLICABILITY

While the afore-described embodiments of the present invention have been described in the context of an IEEE 802.11 system, they are applicable to various mobile communication systems.

The invention claimed is:

1. A method for performing Virtual Carrier Sensing (VCS) by a STAtion (STA) in a Wireless Local Area Network (WLAN) system, the method comprising:
receiving a first frame by the STA;
obtaining, by the STA using the first frame, a channel bandwidth type of the first frame and a response indication parameter indicating an expected response frame type for the first frame;
determining, by the STA, a VCS based deferral time length by using at least one of the expected response frame type indicated by the response indication parameter or the channel bandwidth type of the first frame; and
deferring, by the STA, channel access during the VCS based deferral time length.

2. The method according to claim 1, wherein a channel bandwidth type of a response frame transmitted in response to the first frame is determined based on the channel bandwidth type of the first frame.

3. The method according to claim 1, wherein the channel bandwidth type is one of a 1-MHz preamble channel bandwidth type and a 2-MHz or above preamble channel bandwidth type.

4. The method according to claim 1, wherein if the response indication parameter indicates a normal response frame, the VCS based deferral time length is determined based on the sum of a transmission time of the normal response frame and a Short Inter-Frame Space (SIFS).

5. The method according to claim 4, wherein the transmission time of the normal response frame is determined according to the channel bandwidth type.

6. The method according to claim 4, wherein the transmission time of the normal response frame is determined separately for a 1-MHz preamble channel bandwidth type and a 2-MHz or above preamble channel bandwidth type.

7. The method according to claim 1, wherein if the response indication parameter indicates a Null Data Packet (NDP) response frame, the VCS based deferral time length is determined based on a transmission time of the NDP response frame and an SIFS.

8. The method according to claim 7, wherein the transmission time of the NDP response frame is determined according to the channel bandwidth type.

9. The method according to claim 7, wherein the transmission time of the NDP response frame is determined separately for a 1-MHz preamble channel bandwidth type and a 2-MHz or above preamble channel bandwidth type.

10. The method according to claim 1, if the response indication parameter indicates a long response frame, the VCS based deferral time length is determined based on the sum of a maximum Physical Layer Convergence Protocol (PLCP) Protocol Data Unit (PPDU) transmission time and an SIFS.

11. The method according to claim 1, wherein if the response indication parameter indicates no response, the VCS based deferral time length is set to 0.

12. The method according to claim 1,
wherein an Address 1 field indicating a Receiver Address (RA) of the first frame includes an Association Identifier (AID) value, and an Address2 field indicating a Transmitter Address (TA) of the first frame includes a Medium Access Control (MAC) address value, and
wherein if the AID value of the Address 1 field is identical to an AID value of the STA and the MAC address value of the Address2 field is identical to a MAC address value of an Access Point (AP) with which the STA is associated, a response frame is generated for the first frame.

13. The method according to claim 1, wherein if an Address 1 field indicating an RA of the first frame includes a MAC address value, and the MAC address value of the Address1 field is identical to a MAC address value of the STA, a response frame is generated for the first frame.

14. The method according to claim 1, wherein the STA is an STA operating in a Sub 1 GHz (S1G) frequency band.

15. The method according to claim 1, wherein the response indication parameter indicates one of a plurality of expected response frame types including a no response type, a null data packet (NDP) response type, a long response type and a normal response type.

16. A STAtion (STA) for performing Virtual Carrier Sensing (VCS) in a Wireless Local Area Network (WLAN) system, the STA comprising:
a transceiver; and
a processor, wherein the processor is configured to:
receive a first frame using the transceiver,
obtain, by using the first frame, a channel bandwidth type of the first frame and a response indication parameter indicating an expected response frame type for the first frame,
determine a VCS based deferral time length by using at least one of the expected response frame type indicated by the response indication parameter or the channel bandwidth type of the frame, and
defer channel access during the VCS based deferral time length.

* * * * *